United States Patent
Katayama

(10) Patent No.: US 7,200,076 B2
(45) Date of Patent: Apr. 3, 2007

(54) RADIAL TILT DETECTION OPTICAL HEAD APPARATUS AND OPTICAL INFORMATION APPARATUS

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 493 days.

(21) Appl. No.: 10/298,909

(22) Filed: Nov. 19, 2002

(65) Prior Publication Data
US 2003/0095485 A1 May 22, 2003

(30) Foreign Application Priority Data
Nov. 20, 2001 (JP) ............................ 2001-354894

(51) Int. Cl.
*G11B 7/00* (2006.01)

(52) U.S. Cl. .................. 369/44.32; 369/53.19; 369/112.01; 369/112.1

(58) Field of Classification Search ............ 369/44.23, 369/44.24, 44.32, 112.01, 112.02, 112.05, 369/112.1, 112.15, 120, 53.19, 44.42
See application file for complete search history.

(56) References Cited

U.S. PATENT DOCUMENTS
5,793,733 A * 8/1998 Takeda et al. ......... 369/112.02

FOREIGN PATENT DOCUMENTS
| JP | S62-067737 A | 3/1987 |
|---|---|---|
| JP | H02-042648 A | 2/1990 |
| JP | 9-81942 A | 3/1997 |
| JP | 9-161293 A | 6/1997 |
| JP | 11-296875 A | 10/1999 |
| JP | 2000-82226 A | 3/2000 |
| JP | 2000-082226 A | 3/2000 |
| JP | 2001-236666 A | 8/2001 |

OTHER PUBLICATIONS

R. Katayama et al., "Substrate Thickness Error and Radial Tilt Detection Using 5–Beam Optical Head", Optical Data Storage Topical Meeting 2001, (Apr. 2001), pp. 97–99.

R. Katayama et al., "Radial Tilt Detection Using 3–Beam Optical Head", Proceedings of SPIE, vol. 409D, (2000), pp. 309–318.

Y. Motegi et al., "Development of Tilt Servo System using 4–Axis Lens Actuator for Disc Tilt Compensation", Joint International Symposium on Optical Memory and Optical Data Storage, (Jul. 1999), pp. 20–22.

S. Ohtaki et al., "The Applications of a Liquid Crystal Panel for the 15 Gbyte Optical Disk Systems", Jpn. J. Appl. Phys., vol. 38, (1999), pp. 1744–1749.

* cited by examiner

*Primary Examiner*—Nabil Hindi
(74) *Attorney, Agent, or Firm*—Sughrue Mion, PLLC

(57) ABSTRACT

In an optical head apparatus for an optical recording medium, including a light source for emitting a light beam, an objective lens for focusing the light beam at the optical recording medium and receiving a reflected light beam from the optical recording medium, and a photodetector for receiving the reflected light beam from the objective lens, a unit is provided between the light source and the objective lens to generate a main beam and a sub beam from the light beam. The intensity distributions of the main beam and the sub beam are different from each other, and the sub beam is divided into a plurality of portions having different phase distributions from each other. The photodetector includes photodetecting portions for each of the main beam and the sub beam, thus obtaining a push-pull signal from each of the main beam and the sub beam.

67 Claims, 22 Drawing Sheets

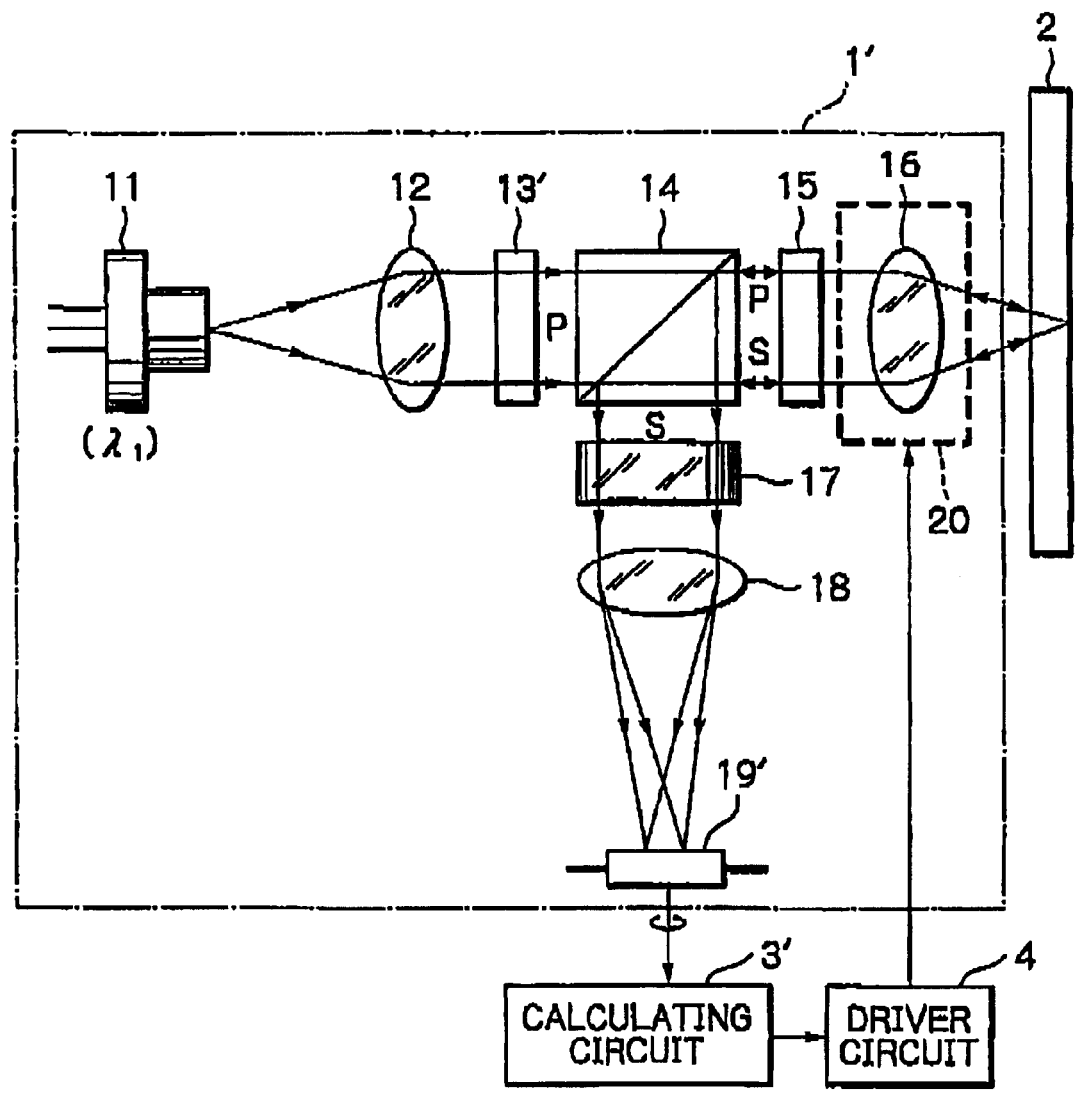

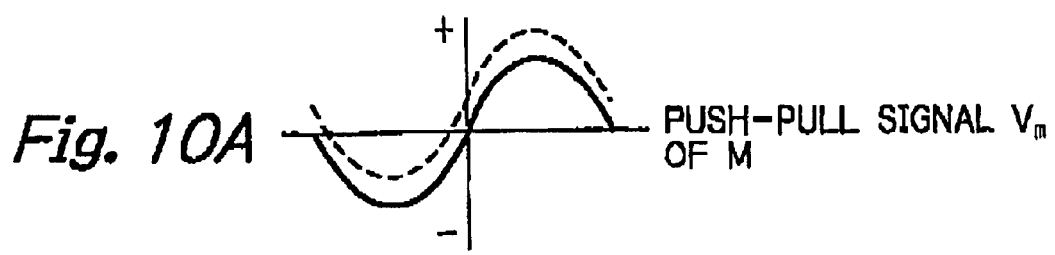
Fig. 10A — PUSH-PULL SIGNAL $V_m$ OF M
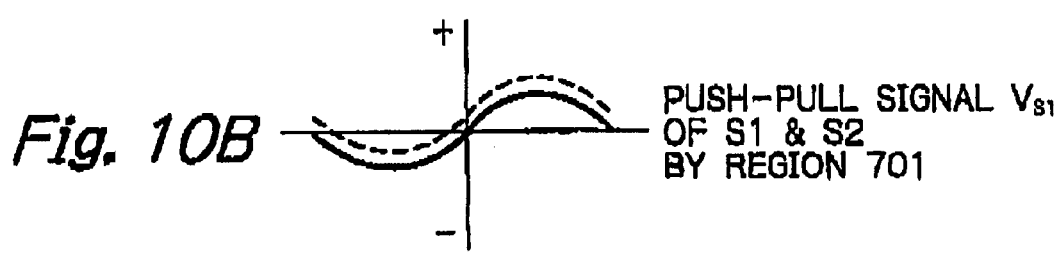
Fig. 10B — PUSH-PULL SIGNAL $V_{s1}$ OF S1 & S2 BY REGION 701
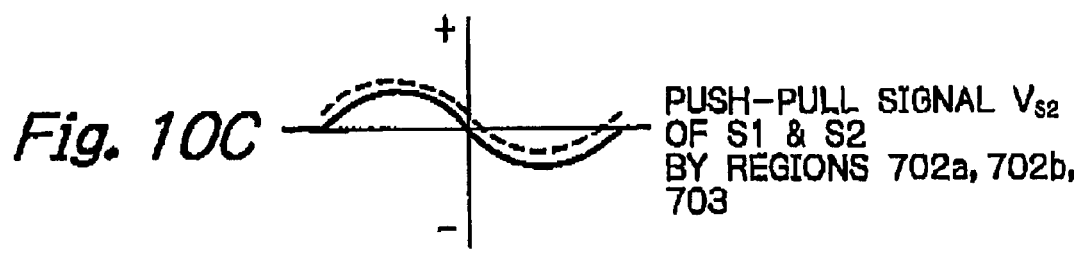
Fig. 10C — PUSH-PULL SIGNAL $V_{s2}$ OF S1 & S2 BY REGIONS 702a, 702b, 703
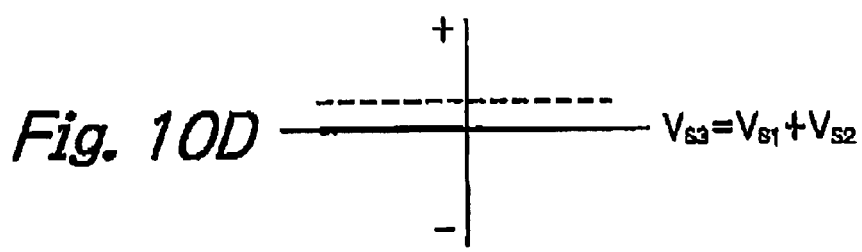
Fig. 10D — $V_{s3} = V_{s1} + V_{s2}$
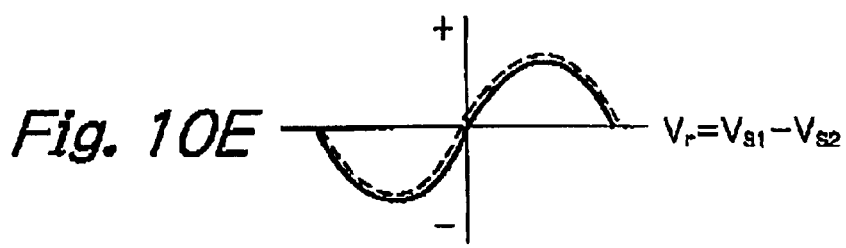
Fig. 10E — $V_r = V_{s1} - V_{s2}$

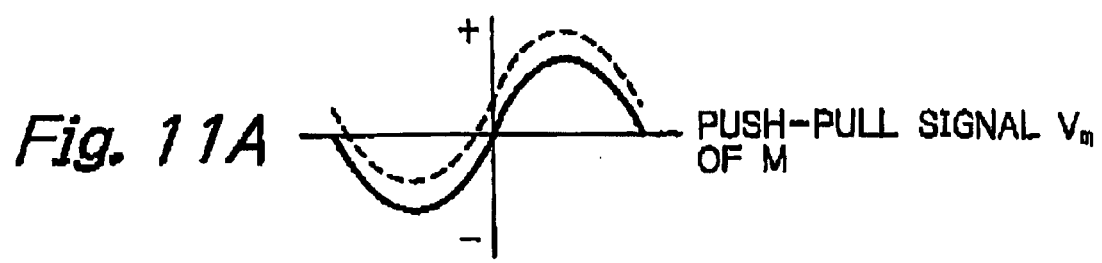
Fig. 11A — PUSH-PULL SIGNAL $V_m$ OF M
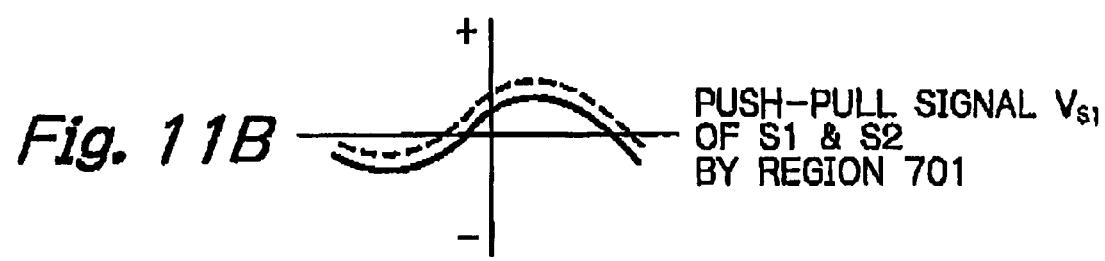
Fig. 11B — PUSH-PULL SIGNAL $V_{S1}$ OF S1 & S2 BY REGION 701
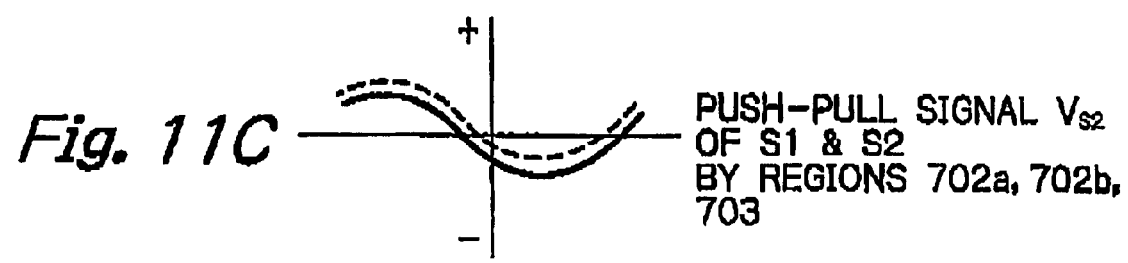
Fig. 11C — PUSH-PULL SIGNAL $V_{S2}$ OF S1 & S2 BY REGIONS 702a, 702b, 703
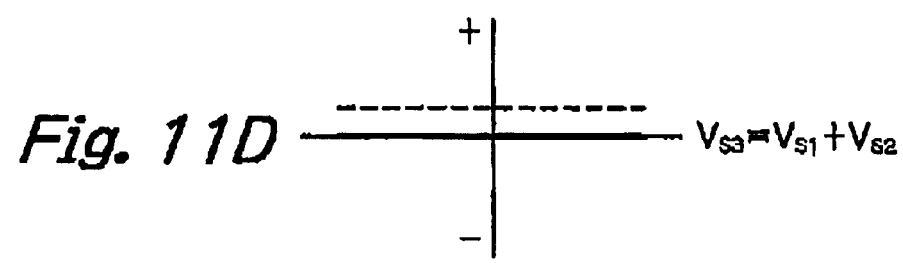
Fig. 11D — $V_{S3} = V_{S1} + V_{S2}$
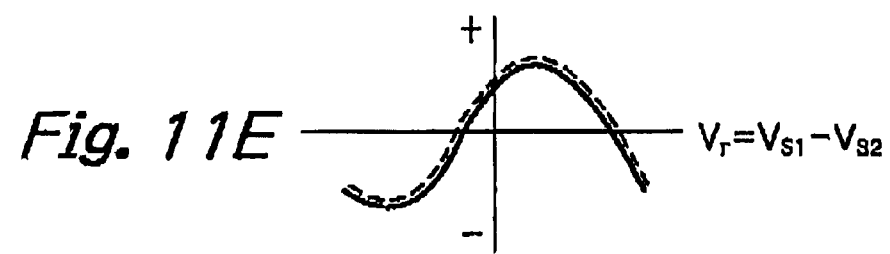
Fig. 11E — $V_r = V_{S1} - V_{S2}$

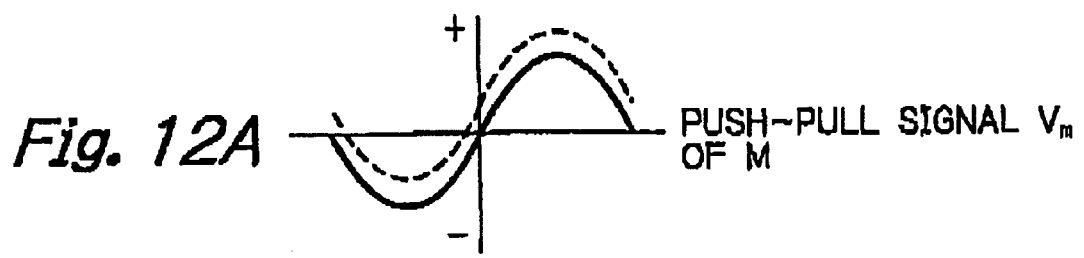
Fig. 12A — PUSH-PULL SIGNAL $V_m$ OF M
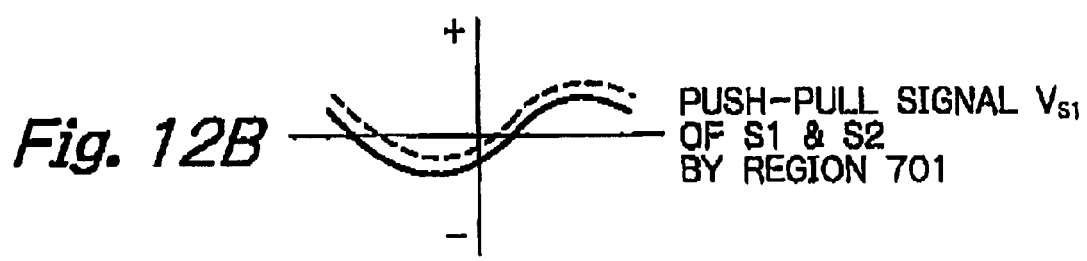
Fig. 12B — PUSH-PULL SIGNAL $V_{S1}$ OF S1 & S2 BY REGION 701
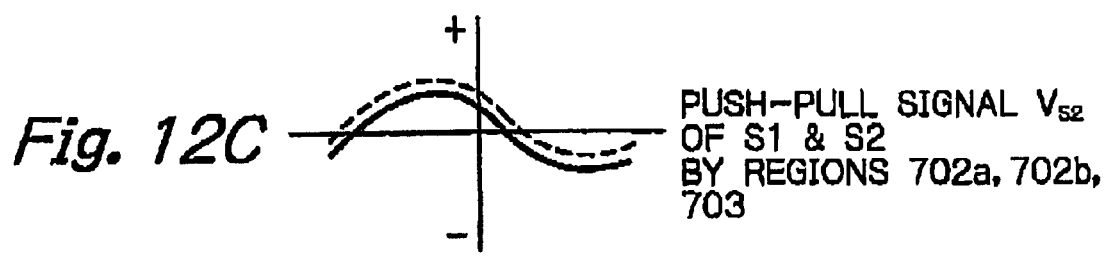
Fig. 12C — PUSH-PULL SIGNAL $V_{S2}$ OF S1 & S2 BY REGIONS 702a, 702b, 703
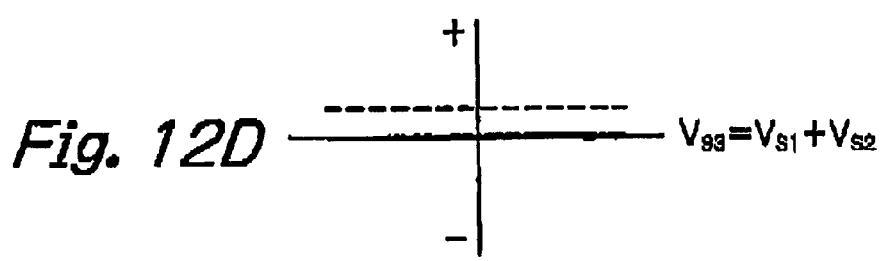
Fig. 12D — $V_{S3} = V_{S1} + V_{S2}$
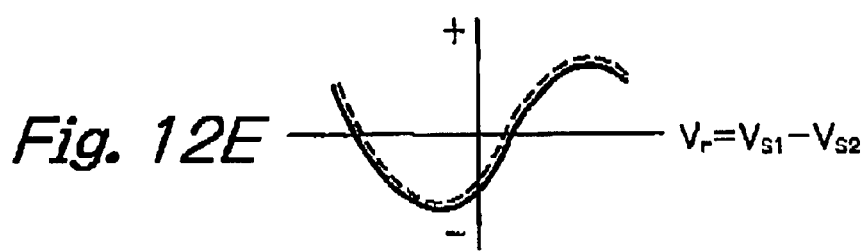
Fig. 12E — $V_r = V_{S1} - V_{S2}$

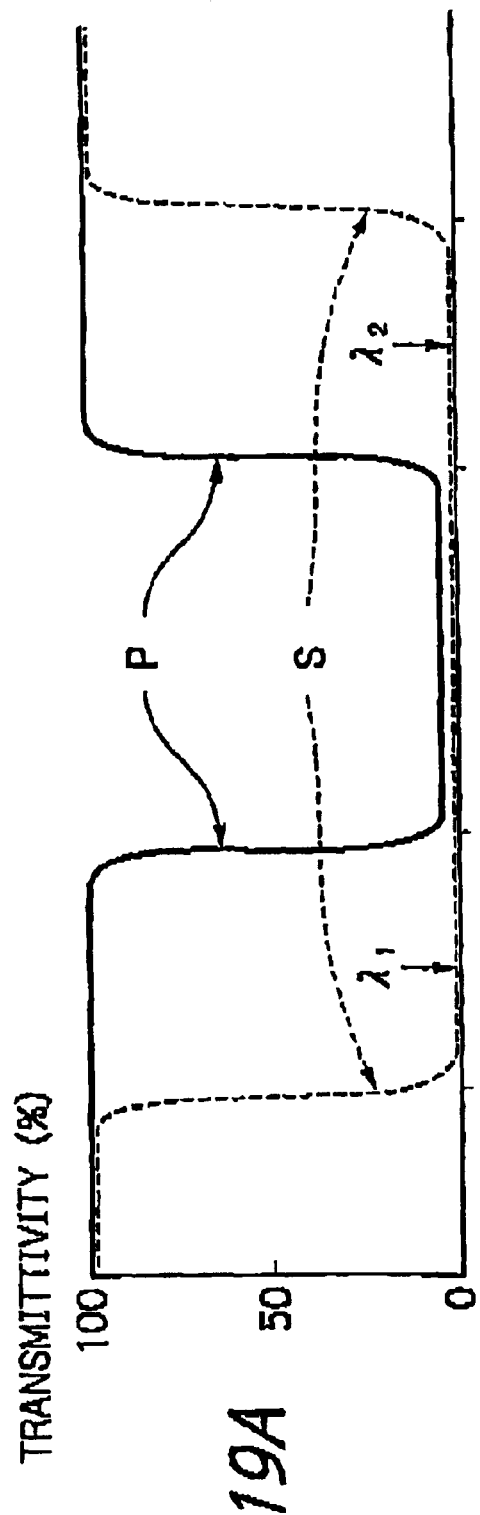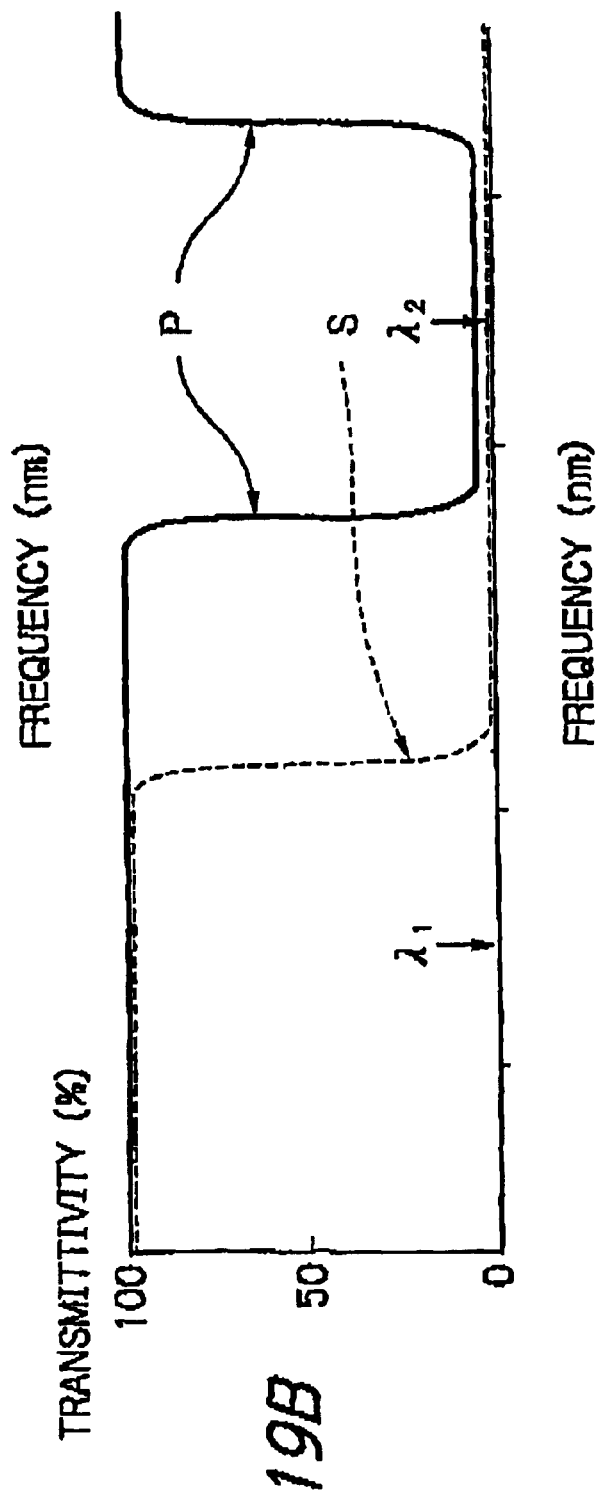

RADIAL TILT DETECTION OPTICAL HEAD APPARATUS AND OPTICAL INFORMATION APPARATUS

BACKGROUND OF THE INVENTION

1. Field of the Invention

The present invention relates to an optical head apparatus for detecting a radial tilt of an optical recording medium and an optical information apparatus for performing at least one of recording and reproducing operations using such an optical head apparatus.

2. Description of the Related Art

Generally, in an optical recording medium such as a recordable or a rewritable optical disk, a tracking groove is formed in advance only for a tracking operation. That is, a tracking error signal is calculated by the tracking groove using a push-pull method, so that the location of an objective lens is changed in accordance with the tracking error signal. In this case, if the objective lens is shifted in the radial direction of the optical recording medium, a so-called lens radial shift offset occurs in the tracking error signal.

A first prior art optical head apparatus is known to reduce the above-mentioned lens radial shift offset, thus suppressing the deterioration of the read/write characteristics due to the lens radial shift offset (see: JP-A-2000-082226).

On the other hand, in an optical recording and reproducing apparatus including an optical head apparatus, the recording density is inversely-proportional to the square value of the diameter of focused spots formed on an optical recording medium. That is, the smaller the diameter of focused spots, the larger the recording density. Also, the diameter of focused spots is inversely-proportional to the numerical aperture of an objective lens. That is, the larger the numerical aperture of the objective lens, the smaller the diameter of focused spots.

When the optical recording medium is inclined in the radial direction with respect to the objective lens, the configuration of focused spots fluctuates due to the coma aberration arisen from the inclination of the optical recording medium in the radial direction which is called a radial tilt, so that the read/write characteristics deteriorate. The coma aberration is proportional to the cubic value of the numerical aperture of the objective lens. That is, the larger the numerical aperture of the objective lens, the narrower the margin of the radial tilt of the optical recording medium for the read/write characteristics. Therefore, in an optical recording and reproducing apparatus having an optical head apparatus with a larger numerical aperture objective lens, it is required to detect and compensate for a radial tilt of the optical recording medium.

A second prior art optical head apparatus is known to detect and compensate for a radial tilt of an optical recording medium (see: Ryuichi Katayama et al., "Substrate Thickness Error and Radial Tilt Detection Using 5-Beam Optical Head", Optical Data Storage Topical Meeting 2001, pp. 97–99, April 2001). This will be explained later in detail.

In the above-described first prior art optical head apparatus, it is impossible to detect and compensate for a radial tilt of the optical recording medium.

On the other hand, in the above-described second prior art optical head apparatus, it is impossible to reduce the lens radial shift offset in the tracking error signal, so that the read/write characteristics deteriorate. Also, since five focused beams each requiring four photodetecting portions, i.e., twenty photodetecting portions are used, a control unit including current-to-voltage conversion circuits connected to the photodetecting portions and calculating circuits becomes complex, which would increase the manufacturing cost.

A third prior art optical head apparatus is known to reduce the lens radial shift offset in the tracking error signal as well as to detect and compensate for a radial tilt of the optical recording medium(see: Ryuichi Katayama et al. "Radial Tilt Detection Using 3-Beam Optical Head", Proceedings of SPIE, Vol. 4090, pp. 309–318, 2000). That is, three focused beams i.e., a main beam and two sub beams are used, and two photodetectors are required for each of the three focused beams.

In the above-described third prior art optical head apparatus, however, since a radio frequency (RF) signal is obtained from only one photodetector for the main beam, the signal-to-noise (S/N) ratio of the RF signal is low.

SUMMARY OF THE INVENTION

It is an object of the present invention to provide an optical head apparatus capable of reducing the lens radial shift offset in a tracking error signal, detecting and compensating for a radial tilt of an optical recording medium, simplifying the control unit, and obtaining a higher S/N ratio RF signal.

Another object is to provide an optical information apparatus for performing at least one of recording and reproducing operations using such an optical head apparatus.

According to the present invention, in an optical head apparatus for an optical recording medium including a light source for emitting a light beam, an objective lens for focusing the light beam at the optical recording medium and receiving a reflected light beam from the optical recording medium, and a photodetector for receiving the reflected light beam from the objective lens, a unit is provided between the light source and the objective lens to generate a main beam and a sub beam from the light beam. In this case, intensity distributions of the main beam and the sub beam are different from each other, and the sub beam is divided into a plurality of portions having different phase distributions from each other. Also, the photodetector includes photodetecting portions for each of the main beam and the sub beam, thus obtaining a push-pull signal from each of the main beam and the sub beam.

BRIEF DESCRIPTION OF THE DRAWINGS

The present invention will be more clearly understood from the description set forth below, as compared with the prior art, with reference to the accompanying drawings, wherein:

FIG. 6 is a diagram illustrating a first embodiment of the optical head apparatus according to the present invention;

FIGS. 10A, 10B, 10C, 10D and 10E are graphs showing various signals relating to the radial tilt signal of FIG. 6 where there is no radial tilt in the disk;

FIGS. 11A, 11B, 11C, 11D and 11E are graphs showing various signals relating to the radial tilt signal of FIG. 6 where there is a positive radial tilt in the disk;

FIGS. 12A, 12B, 12C, 12D and 12E are graphs showing various signals relating to the radial tilt signal of FIG. 6 where there is a negative radial tilt in the disk;

FIGS. 19A and 19B are diagrams showing the transmittivity characteristics of the beam splitters of FIG. 18;

DESCRIPTION OF THE PREFERRED EMBODIMENTS

Before the description of the preferred embodiments, a prior art optical head apparatus, which corresponds to the above-described second prior art optical head apparatus, will be explained with reference to FIGS. 1, 2, 3 and 4.

Figure 1:
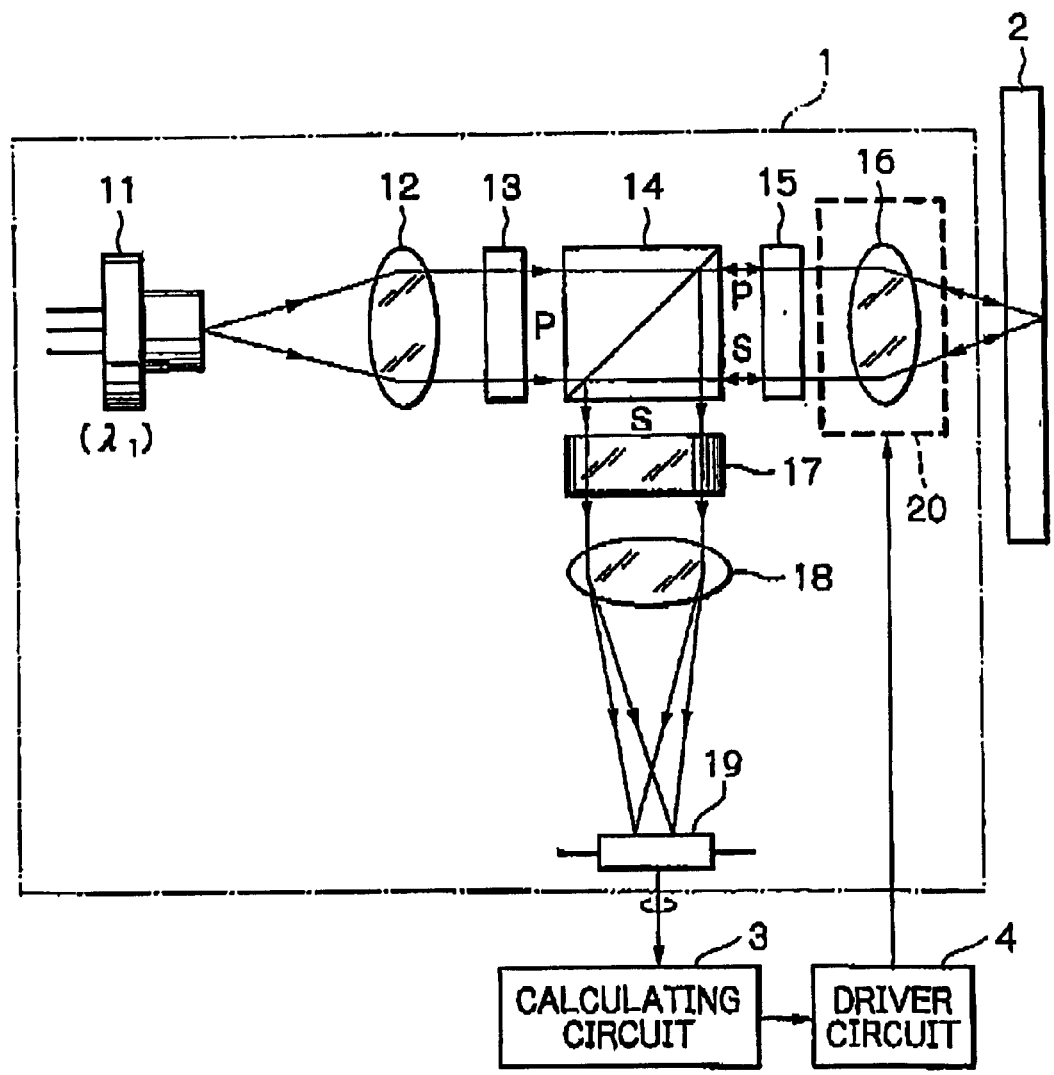
FIG. 1 is a diagram illustrating a prior art optical head apparatus.

In FIG. 1, which illustrates a prior art optical head apparatus (see: Ryuichi Katayama et al., "Substrate Thickness Error and Radial Tilt Detection Using 5-Beam Optical Head", Optical Data Storage Topical Meeting 2001, pp. 97–99, April 2001), reference numeral 1 designates an optical head apparatus on which an optical recording medium, i.e., a disk 2 is mounted. Also, a calculating circuit 3 and a driver circuit 4 are connected to the optical head apparatus 1.

In the optical head apparatus 1 of FIG. 1, a laser diode 11 generates a P-polarized light beam which reaches a collimator lens 12 for converting the light beam therethrough into a collimated light beam. Then, the collimated light beam is divided by a diffractive grating 13 into a main beam (transmission light beam) and four sub beans (diffracted light beams). Most (almost 100%) of the main beam and most (almost 100%) of the sub beams are transmitted through a beam splitter 14 and are converted by a quarter-wave plate 15 from a linearly-polarized (P-polarized) light mode to a circularly-polarized light mode.

The circularly-polarized light beams converted by the quarter-wave plate 15 are focused by an objective lens 16 at the disk 2.

The circularly-polarized light beans reflected by the disk 2 are returned by the objective lens 16 to the quarter-wave plate 15, so that the circularly-polarized light beams are converted into S-polarized light beams. Most (almost 100%) of the S-polarized light beams of the quarter-wave plate 15 are reflected by the beam splitter 14 and pass through a cylindrical lens 17 and a convex lens 18 to reach a photodetector 19. Note that the photodetector 19 is provided at an intermediate location between the focal lines of the cylindrical lens 17 and the convex lens 18.

The photodetector 19 includes twenty photodetecting portions and twenty current-to-voltage converters connected between the photodetecting portions and the calculating circuit 3 which calculates a focus error signal, a tracking error signal, a radial tilt signal and an RF signal. For example, the driver circuit 4 drives an actuator 20 for tilting the objective lens 16 in the radial direction of the disk 2 in accordance with the radial tilt signal, so that the value of the radial tilt signal is brought close to zero. Note that the actuator 20 is disclosed in Y. Motegi et al., "Development of Tilt Servo System using 4-Axis Lens Actuator for Disc Tilt Compensation", Joint International Symposium on Optical Memory and Optical Data Storage, pp. 20–22, July 1999.

Figure 2:
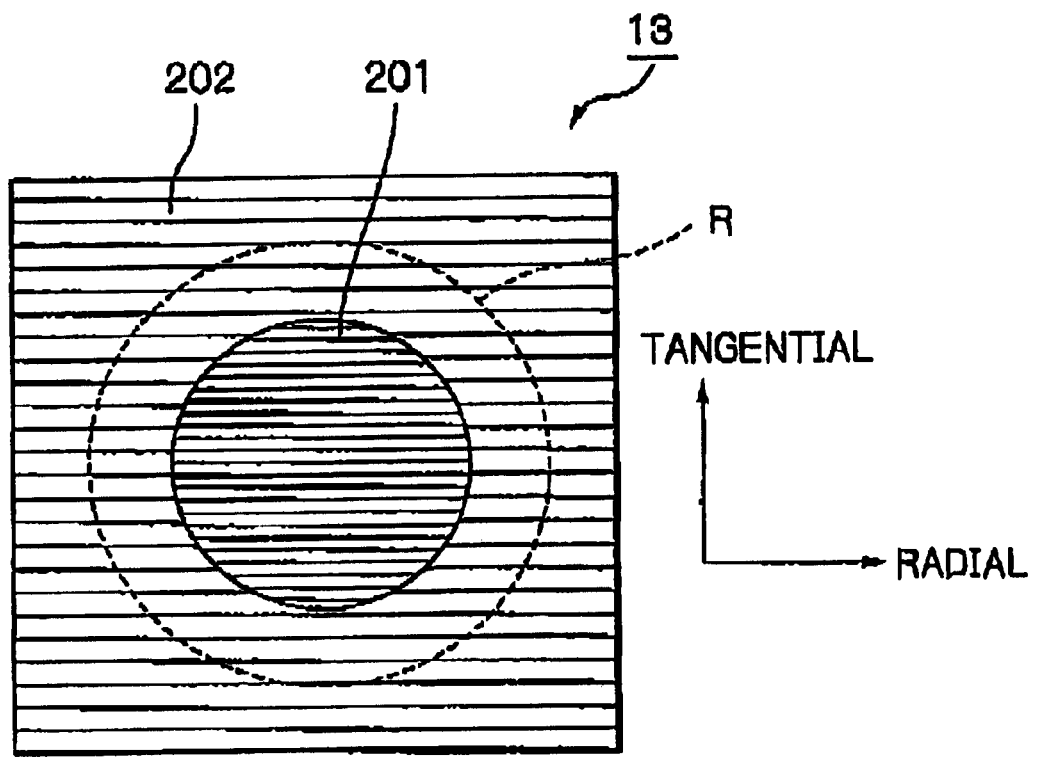
FIG. 2 is a plan view of the diffractive grating of FIG. 1.

In FIG. 2, which is a plan view of the diffractive grating 13 of FIG. 1, reference R designates an effective region of the objective lens 16. The diffractive grating 13 is divided into an inner circular region 201 within the effective region R and an outer region 202 surrounding the inner circular region 201. The grating patterns of the inner circular region 201 are equidistant and parallel to the radial direction of the disk 2. Also, the grating patterns of the outer region 202 are equidistant and parallel to the radial direction of the disk 2. On the other hand, the spacing between the grating patterns of the inner circular region 201 is smaller than the spacing between the grating patterns of the outer region 202.

Assume that the difference in phase (depth) between the line portions and the space portions of the diffractive grating 13 is $0.232\pi$. In this case, about 87.3% of a light beam incident to the inner circular region 201 is converted to a zeroth order light beam (transmission light beam), and about 5.1% of the light beam incident to the inner circular region 201 is converted to ±1st order (diffracted) light beams. Similarly, about 87.3% of a light beam incident to the outer region 202 is converted to a zeroth order light beam (transmission light beam), and about 5.1% of the light beam incident to the outer region 202 is converted to ±1st order (diffracted) light beams. Here, the zeroth order light beams (transmission light beams) of the inner circular region 201 and the outer region 202 are defined as a main beam M, the +1st order diffracted light beam of the inner circular region 201 is defined as a sub beam S1, the +1st order diffracted light beam of the outer region 202 is defined as a sub beam S2, the –1st order diffracted light beam of the outer region 202 is defined as a sub beam S3, and the –1st order diffracted light beam of the inner circular region 201 is defined as a sub beam S4.

Figure 3:
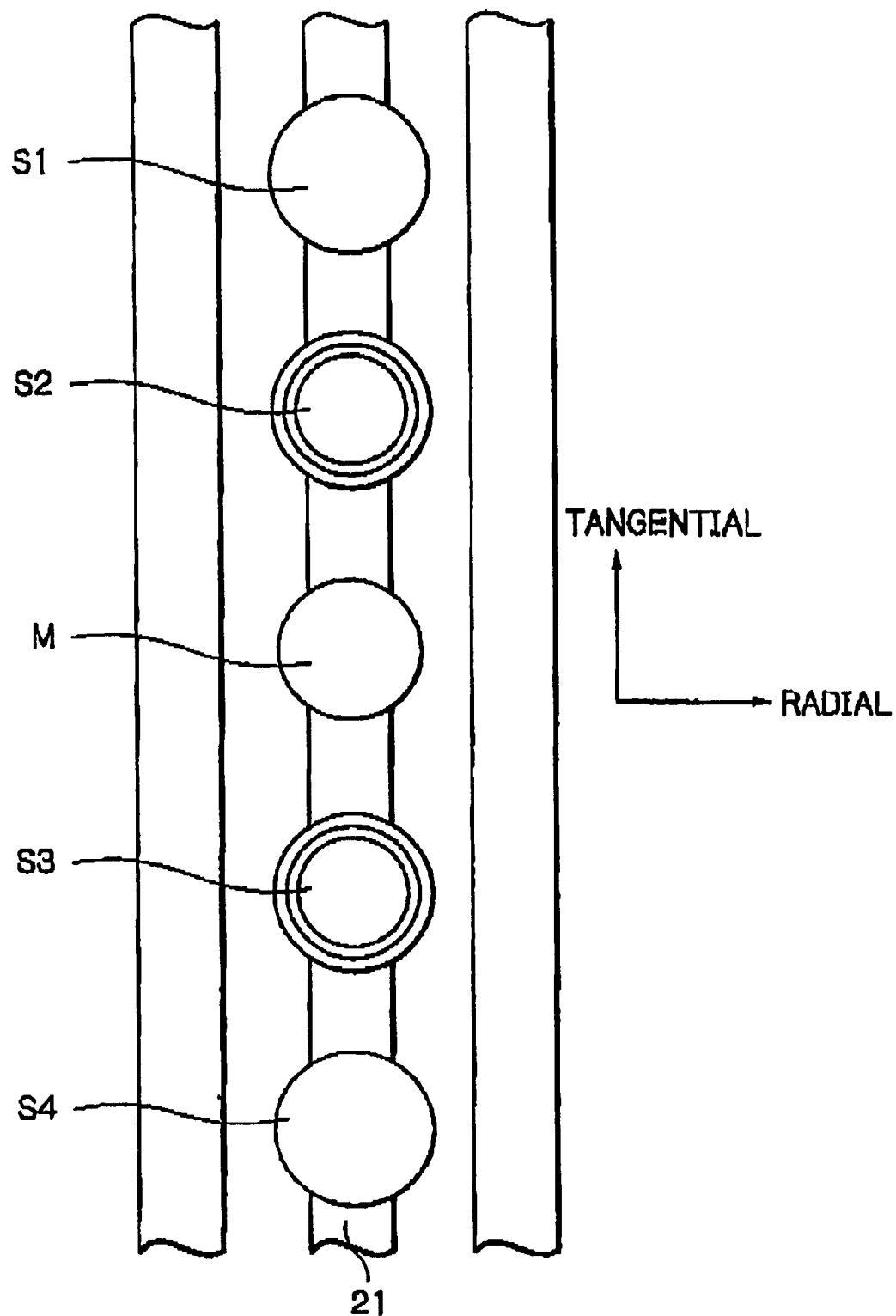
FIG. 3 is a plan view of the focused spots on the disk of FIG. 1.

In FIG. 3, which illustrates focused spots on the disk 2 of FIG. 1, the focus spots of the main beam M and the sub beams S1, S2, S3 and S4 are arranged on one land or groove track 21 of the disk 2 in the tangential direction of the disk 2.

Figure 4:
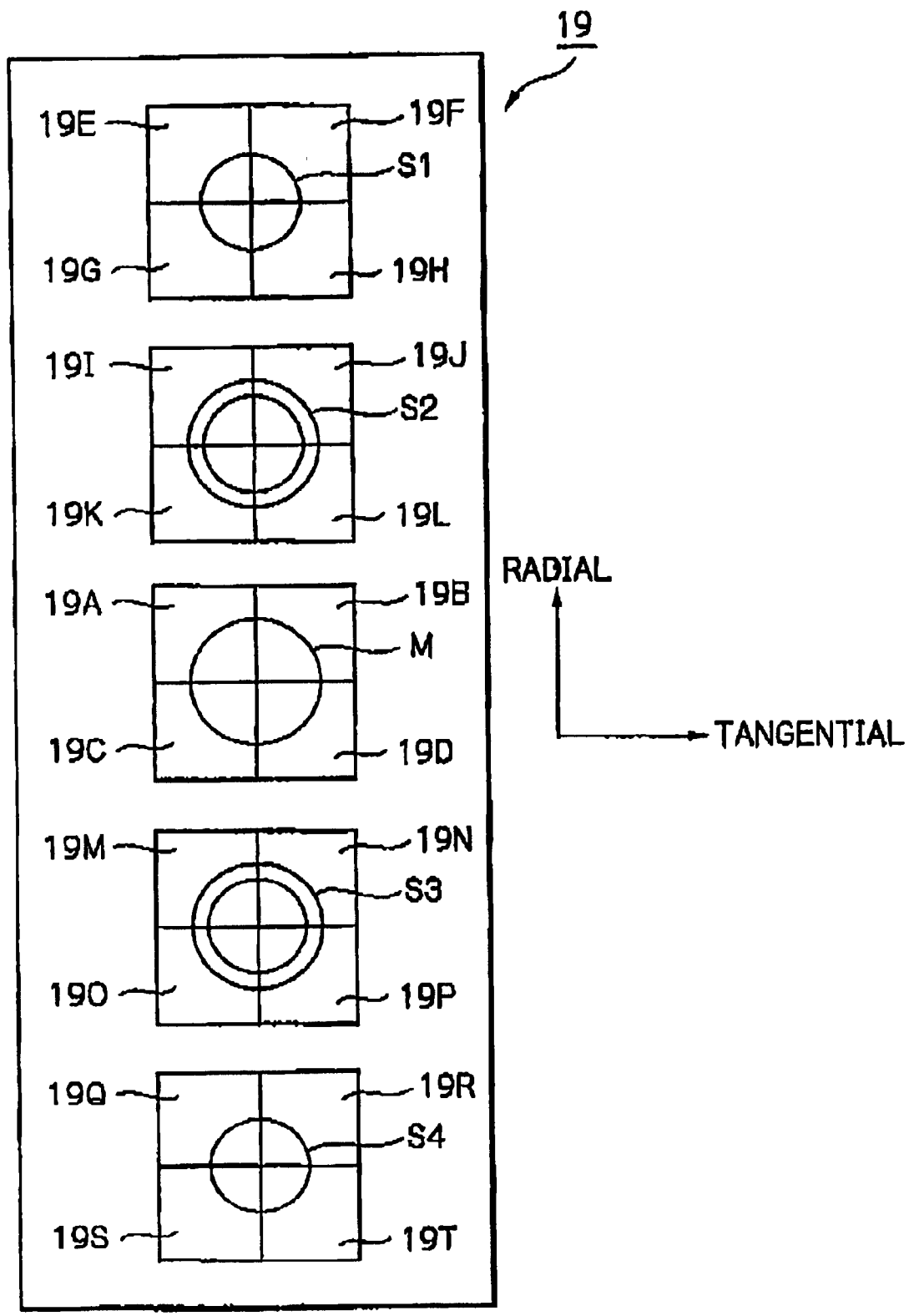
FIG. 4 is a plan view of the optical spots on the photodetctor of FIG. 1.

In FIG. 4, which illustrates optical spots on the photodetector 19 of FIG. 1, the optical spots of the main beam M and the sub beams S1, S2, S3 and S4 are arranged by the cylindrical lens 17 and the convex lens 18 in the radial direction of the disk 2.

The optical spot of the main beam M is received by four photodetecting portions 19A, 19B, 19C and 19D.

The optical spot of the sub beam S1 is received by four photodetecting portions 19E, 19F, 190 and 19H.

The optical spot of the sub beam S2 is received by four photodetecting portions 19I, 19J, 19K and 19L.

The optical spot of the sub beam S3 is received by four photodetecting portions 19M, 19N, 19O and 19P.

The optical spot of the sub beam S4 is received by four photodetecting portions 19Q, 19R, 19S and 19T.

The photodetecting portions 19A, 19B, . . . , 19T generate detection voltages V(19A), V(19B), . . . , V(19T) and transmit them to the calculating circuit 3.

The calculating circuit 3 calculates a focus error signal $V_f$ by a known astigmatism method:

$$V_f = V(19A) + V(19D) - (V(19B) + V(19C)).$$

Also, the calculating circuit 3 calculates a tracking error signal $V_t$ by a known push-pull method;

$$V_t = V(19A) + V(19B) - (V(19C) + V(19D)).$$

Further, the calculating circuit 3 calculates a radial tilt signal $V_r$ by $$V_r = ((V(19E) + V(19F) + V(19Q) + V(19R)) - (V(19G) + V(19H) + V(19S) + V(19T)) - (V(19I) + V(19J) + V(19M) + V(19N)) - (V(19K) + V(19L) + V(19O) + V(19P)).$$

Additionally, the calculating circuit 3 calculates an RF signal $V_{rf}$ by $$V_{rf} = V(19A) + V(19B) + V(19C) + V(19D).$$

The beam splitter 14 is explained next with reference to FIGS. 5A, 5B and 5C.

Figure 5A:
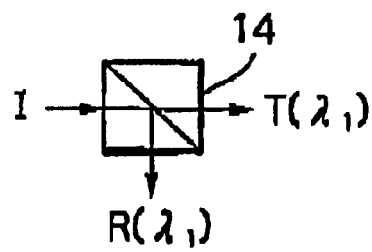
FIG. 5A is a diagram illustrating the transmission light beam and the reflected light beam of the beam splitter of FIG. 1.

As shown in FIG. 5A, the beam splitter 14 transmits a part of an incident light beam I as a transmission light beam T and reflects apart of the incident light beam I as a reflected light beam R. Generally, the transmittivity characteristics of a P-polarized component of the incident light beam I are different from those of an S-polarized component of the incident light beam I, as shown in FIGS. 5B and 5C. Note that the transmittivity characteristics of the beam splitter 14 can be adjusted by changing the number and thickness of dielectric layers sandwiched by two transparent prisms.

Figure 5B:
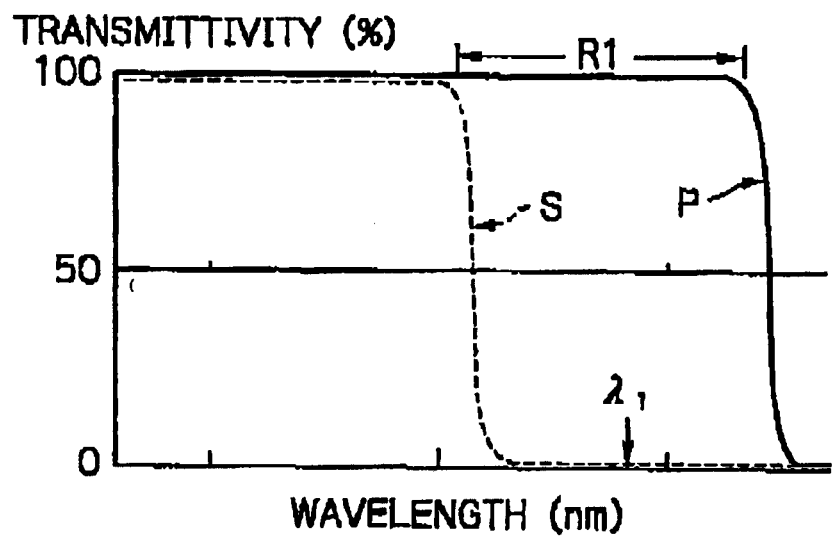
FIGS. 5B and 5C are diagrams showing the transmittivity characteristics of the beam splitter of FIG. 1.
Figure 5C:
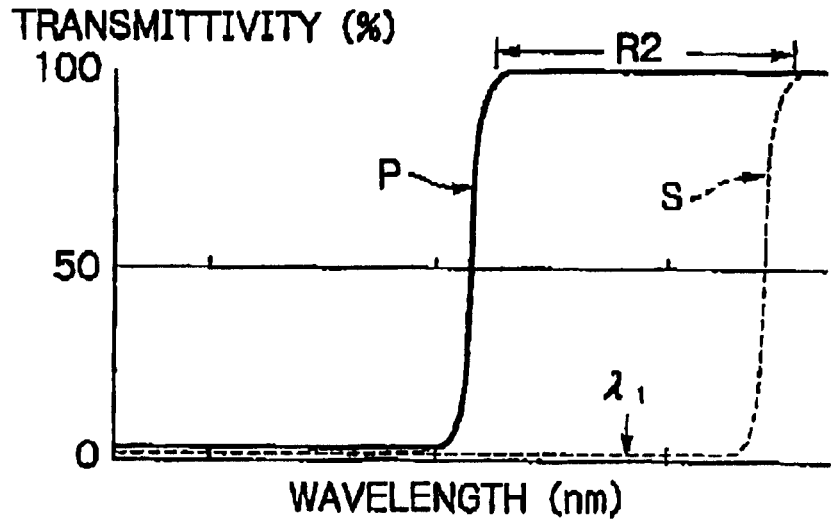

As shown in FIGS. 5B and 5C, there are regions R1 and R2 where the transmittivity of the P-polarized component is about 100% (most than 90%) and the transmittivity of the S-polarized component is about 0% (lens than 10%). In this case, the transmittivity characteristics of the beam splitter 14 are adjusted so that the region R1 or R2 includes the wavelength $\lambda_1$, of the laser diode 11.

In the optical head apparatus of FIG. 1, however, it is impossible to reduce the lens radial shift offset in the tracking error signal, so that the read/write characteristics deteriorate. Also, since five focused beams each requiring four photodetecting portions, i.e., twenty photodetecting portions are used, a control unit including current-to-voltage conversion circuits connected to the photodetecting portions and calculating circuits becomes complex, which would increase the manufacturing cost.

In FIG. 6, which illustrates a first embodiment of the optical head apparatus according to the present invention, the optical head apparatus 1 of FIG. 1 is modified into an optical head apparatus 1' where the diffractive grating 13 and the photodetector 19 of FIG. 1 are modified into a diffractive grating 13' and a photodetector 19', respectively. Also, the calculating circuit 3 of FIG. 1 is modified into a calculating circuit 3'.

Figure 7:
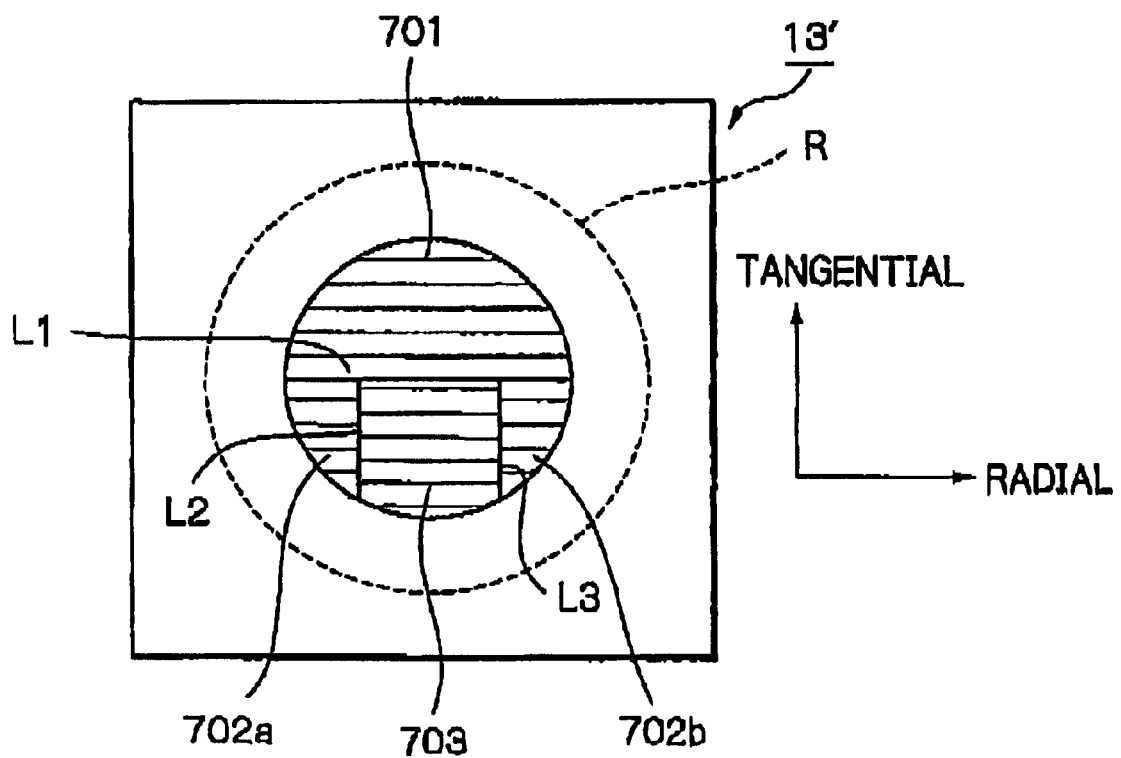
FIG. 7 is a plan view of the diffractive grating of FIG. 6.

In FIG. 7, which is a plan view of the diffractive grating 13' of FIG. 6, the diffractive grating region is circular within the effective region R. The diffractive grating region is divided by a straight line L1 parallel to the radial direction of the disk 2 including the optical axis and two straight lines L2 and L3 parallel to the tangential direction of the disk 2 into regions 701, 702a, 702b and 703. In this case, the lines L2 and L3 are linearly-symmetrical with respect to the tangential direction of the disk 2 including the optical axis.

The grating patterns of the regions 701, 702a, 702b and 703 are equidistant and parallel to the radial direction of the disk 2. On the other hand, the grating patterns of the region 702a (702b) and the region 701 are out of phase by $+\pi/2$, and the grating patterns of the regions 703 and 701 are out of phase by $-\pi/2$. That is, the phase of the grating patterns of the regions 702a and 702b is advanced by $\pi$ as compared with the phase of the grating patterns of the region 703.

Assume that the difference in phase (depth) between the line portions and the space portions of the diffractive grating 13' is $0.232\pi$. In this case, about 87.3% of a light beam incident to the regions 701, 702a, 702b and 703 is converted to a zeroth order light beam (transmission light beam), and about 5.1% of the light beam incident to the regions 701, 702a, 702b and 703 is converted to $\pm$1st order (diffracted) light beams. On the other hand, most (about 100%) of a light beam incident to a region outside of the regions 701, 702a, 702b and 703 within the region R is transmitted therethrough.

Here, the zeroth order light beams (transmission light beams) of the regions 701, 702a, 702b and 703 and the region outside thereof are defined as a main beam M, the +1st order diffracted light beams of the regions 701, 702a, 702b and 703 are defined as a sub beam S1, and the −1st order diffracted light beams of the regions 701, 702a, 702b and 703 are defined as a sub beam S2.

In the sub beam S1, light beams from the regions 702a and 702b are advanced by a phase of $\pi/2$ with respect to a light beam from the region 701, while a light beam from the region 703 is retarded by a phase of $\pi/2$ with respect to the light beam from the region 701 Moreover, the intensity in the periphery in the sub beam S1 is weaker than that in the main beam M. Similarly, in the sub beam S2, a light beam from the region 703 is advanced by a phase of $\pi/2$ with respect to a light beam from the region 701, while light beams from the regions 702a and 702b are retarded by a phase of $\pi/2$ with respect to the light beam from the region 701. Moreover, the intensity in the periphery in the sub beam S2 is weaker than that in the main beam M.

Figure 8:
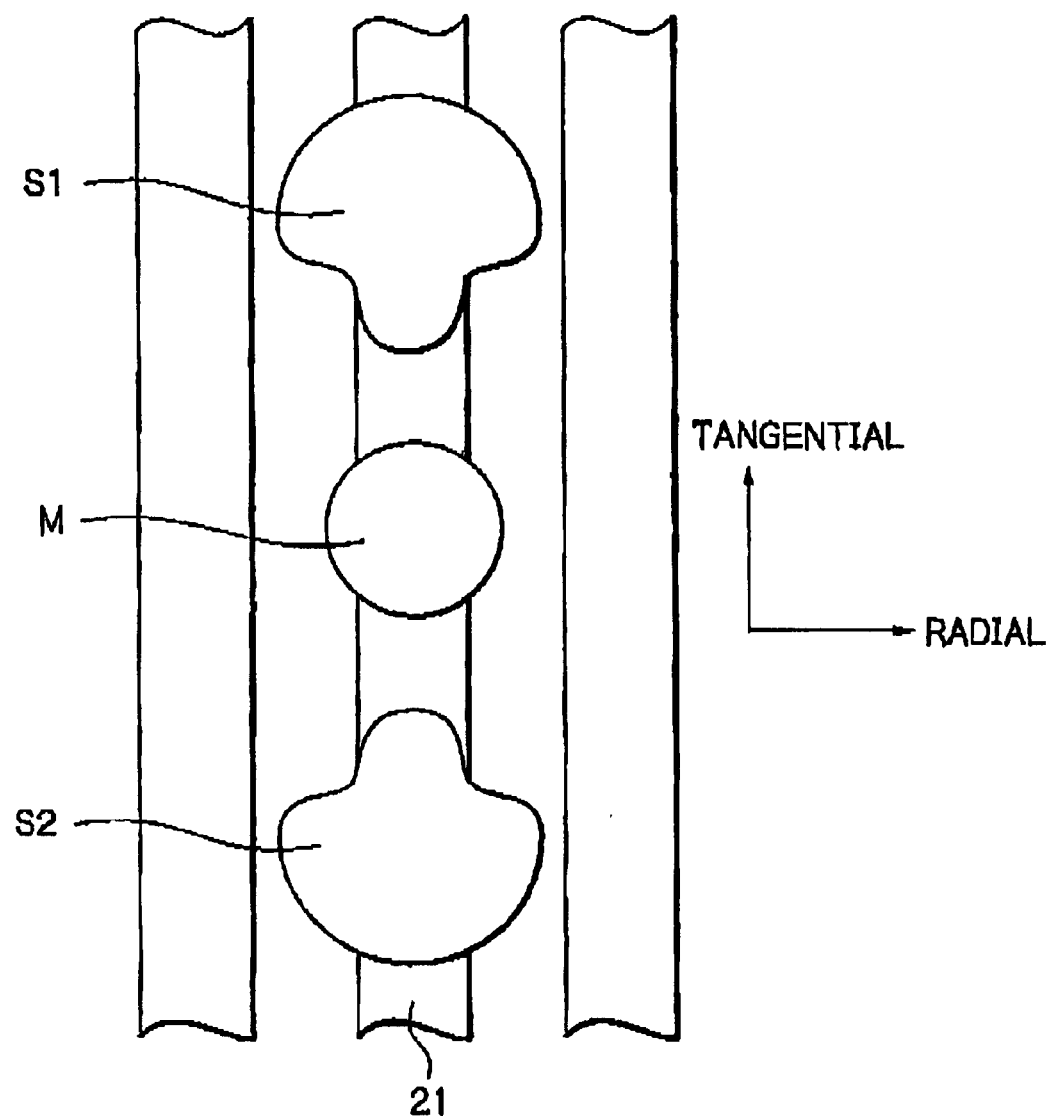
FIG. 8 is a plan view of the focused spots on the disk of FIG. 6.

In FIG. 8, which illustrates focused spots on the disk 2 of FIG. 6, the focus spots of the main beam M and the sub beams S1 and S2 are arranged on one land or groove track 21 of the disk 2 in the tangential direction of the disk 2.

Figure 9:
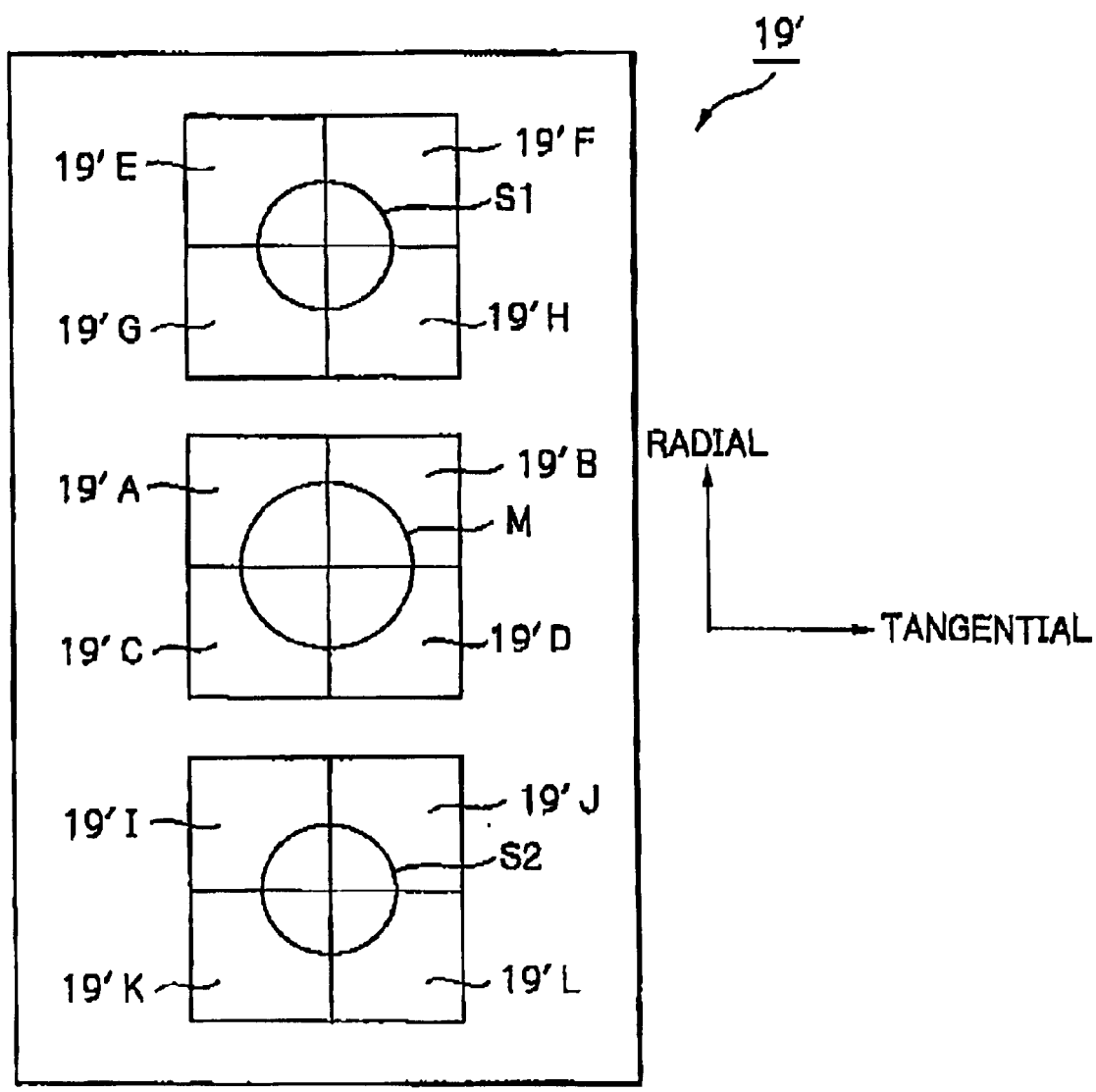
FIG. 9 is a plan view of the optical spots on the photodetctor of FIG. 6.

In FIG. 9, which illustrates optical spots on the photodetector 19' of FIG. 6, the optical spots of the main beam M and the sub beams S1 and S2 are arranged by the cylindrical lens 17 and the convex lens 18 in the radial direction of the disk 2.

The optical spot of the main beam M is received by four photodetecting portions 19'A, 19'B, 19'C and 19'D.

The optical spot of the sub beam S2 is received by four photodetecting portions 19'E, 19'F, 19'G and 19'H.

The optical spot of the sub beam S2 is received by four photodetecting portions 19'I, 19'J, 19'K and 19'L.

The photodetecting portions 19'A, 19'B, . . . , 19'L generate detection voltages V(19'A), V(19'B), . . . , V(19'L) and transmit them to the calculating circuit 3'.

The calculating circuit 3' calculates a focus error signal $V_f$ by a known astigmatism method:

$$V_f = V(19'A) + V(19'D) - ((19'B) + V(19'C)).$$

Also, the calculating circuit 3' calculates a tracking error signal $V_t$ by a known differential push-pull method:

$$V_t=V(19'A)+V(19'B)-(V(19'C)+V(19'D)) -K(V(19'E)+V(19'F)+V(19'I)+V(19'J)) -(V(19'G)+V(19'H)+V(19'K)+V(19'L)).$$

where K is a constant.

Further, the calculating circuit 3' calculates a radial tilt signal $V_r$ by $$V_r=(V(19'E)+V(19'H)+V(19'I)+V(19'L)) -(V(19'F)+V(19'G)+V(19'J)+V(19'K)).$$

Additionally, the calculating circuit 3' calculates an RF signal $V_{rf}$ by $$V_{rf}=V(19'A)+V(19'B)+V(19'C)+V(19'D).$$

Thus, a radial tilt of the disk 2 can be detected and compensated for.

Also, since only three focused beams each requiring four photodetecting portions, i.e., only twelve photodetecting portions 19'A, 19'B, . . . , 19'L are used, a control unit including current-to-voltage conversion circuits connected to the photodetecting portions can be simplified, which would decrease the manufacturing cost. Also, even in this case, Since an RF signal is obtained from four photodetecting portions 19'A, 19'B, 19'C and 19'D for the main beam M, the S/N ratio of the RF signal is not low.

The radial tilt signal $V_r$ is explained next with reference to FIGS. 10A, 10B, 10C, 10D and 10E where there is no radial tilt in the disk 2. In FIGS. 10A, 10B, 10C, 10D and 10E, note that the abscissa designates an off-track amount of the disk 2, a solid line shows a case where the objective lens 16 is not shifted in the radial direction of the disk 2, and a dotted line shows a case where the objective lens 16 is shifted in the radial direction of the disk 2.

A push-pull signal $V_m$ of the main beam M as shown in FIG. 10A is calculated by $$V_m=V(19'A)+V(19'B)-(V(19'C)+V(19'D))$$

A push-pull signal $V_{S1}$ of the sub beams S1 and S2 by the region 701 as shown in FIG. 10B is calculated by $$V_{S1}=V(19'E)+V(19'I)-(V(19'G)+V(19'K))$$

A push-pull signal $V_{S2}$ of the sub beams S1 and S2 by the regions 702a, 702b and 703 as shown in FIG. 10C is calculated by $$V_{S2}=V(19'F)+V(19'J)-(V(19'H)+V(19'L))$$

Since the sub beams S1 and S2 from the regions 702a and 702b are shifted by a phase of π as compared with the sub beams S1 and S2 from the region 703, the polarity of the push-pull signal $V_{S2}$ is opposite to that of the push-pull signal $V_{S1}$ (see: JP-A-9-81942, JP-A-11-296875). Also, the polarity of the lens radial shift offset is the same as that of the push-pull signal $V_m$ of FIG. 10A.

A sum signal $V_{S3}$ of the push-pull signals $V_{S1}$ and $V_{S2}$ as shown in FIG. 10D is calculated by $$V_{S3}=(V(19'E)+V(19'F)+V(19'I)+V(19'J)) -(V(19'G)+V(19'H)+V(19'K)+V(19'L))$$

In the sum signal $V_{S3}$, the fluctuation component by the off-track amount is compensated for, while the radial lens shift offset remains.

On the other hand, the tracking error signal $V_t$ by the differential push-pull method is represented by a difference signal between the push-pull signal $V_m$ of FIG. 10A and the sum signal $V_{S3}$ of FIG. 10D. Therefore, in the tracking error signal $V_t$, the radial lens shift offset is compensated for, while the fluctuation component by the off-track amount remains.

The radial tilt signal $V_r$ as shown in FIG. 10E is represented by $$V_r=V_{S1}-V_{S2}$$

Thus, in the radial tilt signal $V_r$ as shown in FIG. 10E, the radial lens shift offset is compensated for, while the fluctuation component by the off-track amount remains. Also, as shown in FIGS. 10B, 10C and 10E, since there is no radial tilt in the disk 2, the zero crossing points of the signals $V_{S1}$, $V_{S2}$ and $V_r$ coincide with the zero crossing point of the tracking error signal $V_t$. Therefore, when the tracking error signal $V_t$ is zero, the radial tilt signal $V_r$ is also zero.

The radial tilt signal $V_r$ is explained next with reference to FIGS. 11A, 11B, 11C, 11D and 11E where there is a positive radial tilt in the disk 2. Note that FIGS. 11A, 11B, 11C, 11D and 11D correspond to FIGS. 10A, 10B, 10C, 10D and 10E, respectively. That is, as shown in FIGS. 11B, 11C and 11E, since there is a positive radial tilt in the disk 2, the zero crossing points of the signals $V_{S1}$, $V_{S2}$ and $V_r$ are shifted on the left side of the zero crossing point of the tracking error signal $V_t$, because the intensity of the periphery of the sub beams S1 and S2 is weaker as compared with the main beam M, and the amount of the coma aberration due to the radial tilt of the disk 2 is smaller. Therefore, when the tracking error signal $V_t$ is zero, the radial tilt signal $V_r$ is positive.

The radial tilt signal $V_r$ is explained next with reference to FIGS. 12A, 12B, 12C, 12D and 12E where there is a negative radial tilt in the disk 2. Note that FIGS. 12A, 12B, 12C, 12D and 12E correspond to FIGS. 10A, 10B, 10C, 10D and 10E, respectively. That is, as shown in FIGS. 12B, 12C and 12E, since there is a negative radial tilt in the disk 2, the zero crossing points of the signals $V_{S1}$, $V_{S2}$ and $V_r$ are shifted on the right side of the zero crossing point of the tracking error signal $V_t$, because the intensity of the periphery of the sub beams S1 and S2 is weaker as compared with the main beam M, and the amount of the coma aberration due to the radial tilt of the disk 2 is smaller. Therefore, when the tracking error signal $V_t$ is zero, the radial tilt signal $V_r$ is negative.

Thus, when a radial tilt is detected and compensated for, the lens radial shift offset is also reduced.

Figure 13:
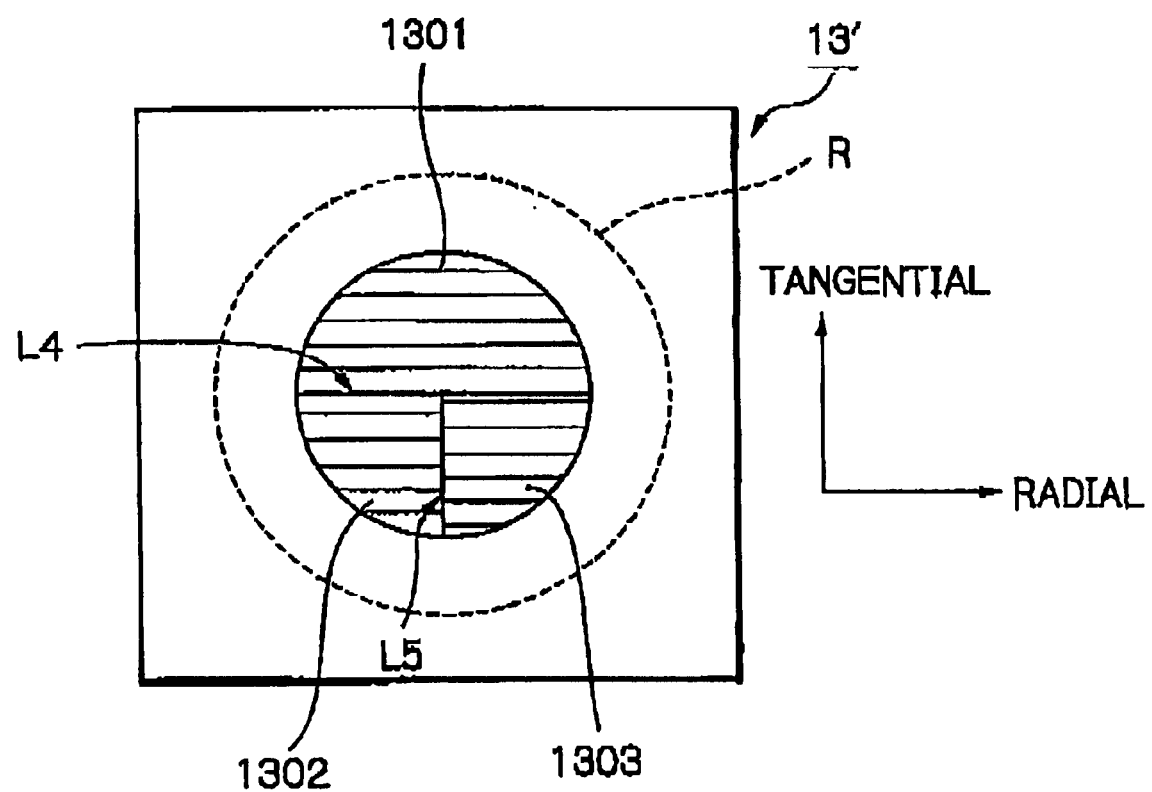
FIGS. 13, 14, 15, 16 and 17 are plan views illustrating first, second, third, fourth and fifth modifications of the diffractive grating of FIG. 6.

In FIG. 13, which illustrates a first modification of the diffractive grating 13' of FIG. 6, the diffractive grating region is also circular within the effective region R. The diffractive grating region is divided by a straight line L4 parallel to the radial direction of the disk 2 including the optical axis and a straight line L5 parallel to the tangential direction of the disk 2 including the optical axis into regions 1301, 1302 and 1303.

The grating patterns of the regions 1301, 1302 and 1303 are equidistant and parallel to the radial direction of the disk 2. On the other hand, the grating patterns of the region 1302 and the region 1301 are out of phase by +π/2, and the grating patterns of the regions 1303 and 1301 are out of phase by −π/2. That is, the phase of the grating patterns of the region 1302 is advanced by π as compared with the phase of the grating patterns of the region 1303.

Assume that the difference in phase (depth) between the line portions and the space portions of the diffractive grating 13' is 0.232π. In this case, about 87.3% of a light beam incident to the regions 1301, 1302 and 1303 is converted to a zeroth order light beam (transmission light beam), and about 5.1% of the light beam incident to the regions 1301, 1302 and 1303 is converted to ±1st order (diffracted) light beams. On the other hand, most (about 100%) of a light beam incident to a region outside of the regions 1301, 1302 and 1303 within the region R is transmitted therethrough.

Here, the zeroth order light beams (transmission light beams) of the regions 1301, 1302 and 1303 and the region outside thereof are defined as a main beam M, the +1st order diffracted light beams of the regions 1301, 1302 and 1303 are defined as a sub beam S1, and the −1st order diffracted light beams of the regions 1301, 1302 and 1303 are defined as a sub beam S2.

In the sub beam S1, a light beam from the region 1302 is advanced by a phase of $\pi/2$ with respect to a light beam from the region 1301, while a light beam from the region 1303 is retarded by a phase of $\pi/2$ with respect to the light beam from the region 1301. Moreover, the intensity in the periphery in the sub beam S1 is weaker than that in the main beam R. Similarly, in the sub beam S2, a light beam from the region 1303 is advanced by a phase of $\pi/2$ with respect to a light beam from the region 1301, while a light beam from the region 1302 is retarded by a phase of $\pi/2$ with respect to the light beam from the region 1301. Moreover, the intensity in the periphery in the sub beam S2 is weaker than that in the main beam M.

Figure 14:
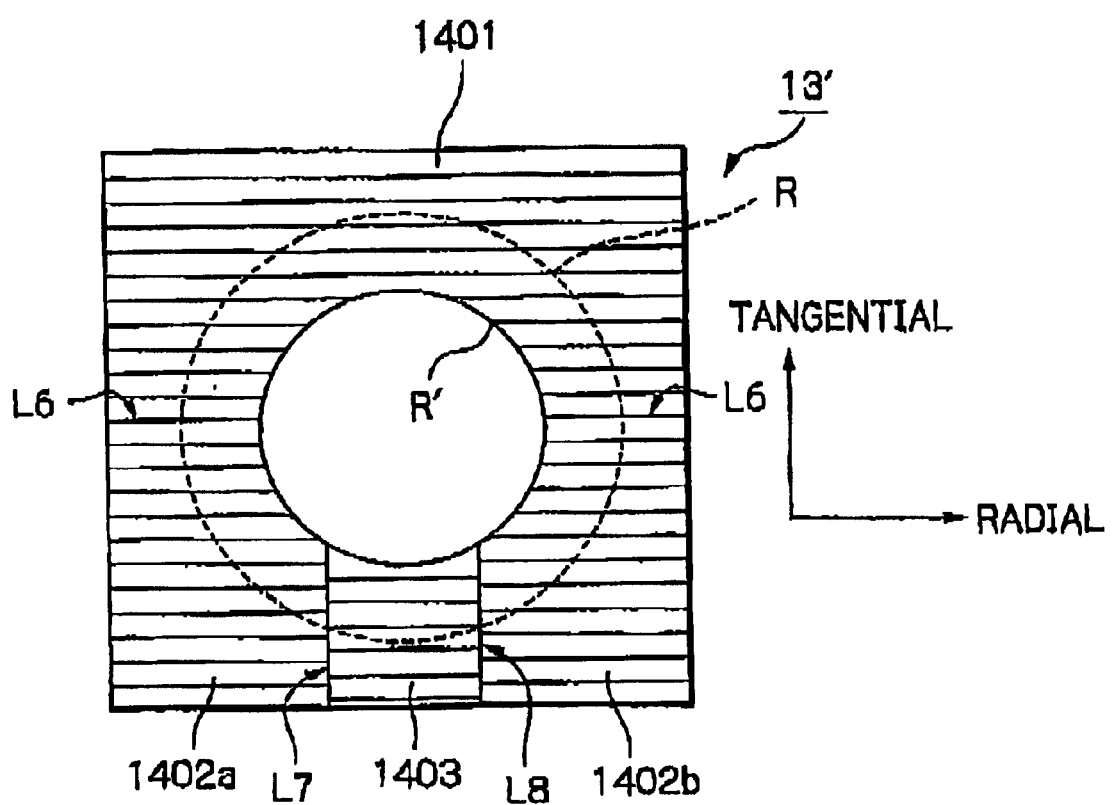

In FIG. 14, which illustrates a second modification of the diffractive grating 13' of FIG. 6, the diffractive grating region is outside of a circle R' within the effective region R. The diffractive grating region is divided by a straight line L6 parallel to the radial direction of the disk 2 including the optical axis and two straight lines L7 and L8 parallel to the tangential direction of the disk 2 into regions 1401, 1402a, 1402b and 1403. In this case, the lines L7 and L8 are linearly-symmetrical with respect to the tangential direction of the disk 2 including the optical axis.

The grating patterns of the regions 1401, 1402a, 1402b and 1403 are equidistant and parallel to the radial direction of the disk 2. On the other hand, the grating patterns of the region 1402a (1402b) and the region 1401 are out of phase by +$\pi/2$, and the grating patterns of the regions 1403 and 1401 are out of phase by −$\pi/2$. That is, the phase of the grating patterns of the regions 1402a and 1402b is advanced by $\pi$ as compared with the phase of the grating patterns of the region 1403.

Assume that the difference in phase (depth) between the line portions and the space portions of the diffractive grating 13' is $0.232\pi$. In this case, about 87.3% of a light beam incident to the regions 1401, 1402a, 1402b and 1403 is converted to a zeroth order light beam (transmission light beam), and about 5.1% of the light beam incident to the regions 1401, 1402a, 1402b and 1403 is converted to ±1st order (diffracted) light beams. On the other hand, most (about 100%) of a light beam incident to a region within the circle R' is transmitted therethrough.

Here, the zeroth order light beams (transmission light beams) of the regions 1401, 1402a, 1402b and 1403 and the region within the circle R' are defined as a main beam M, the +1st order diffracted light beams of the regions 1401, 1402a, 1402b and 1403 are defined as a sub beam S1, and the −1st order diffracted light beams of the regions 1401, 1402a, 1402b and 1403 are defined as a sub beam S2.

In the sub beam S1, light beams from the regions 1402a and 1402b are advanced by a phase of $\pi/2$ with respect to a light beam from the region 1401, while a light beam from the region 1403 is retarded by a phase of $\pi/2$ with respect to the light beam from the region 1401. Moreover, the intensity in the center in the sub beam S1 is weaker than that in the main beam M. Similarly, in the sub beam S2, a light beam from the region 1403 is advanced by a phase of $\pi/2$ with respect to a light beam from the region 1401, while light beams from the regions 1402a and 1402b are retarded by a phase of $\pi/2$ with respect to the light beam from the region 1401. Moreover, the intensity in the center in the sub beam S2 is weaker than that in the main beam M.

Figure 15:
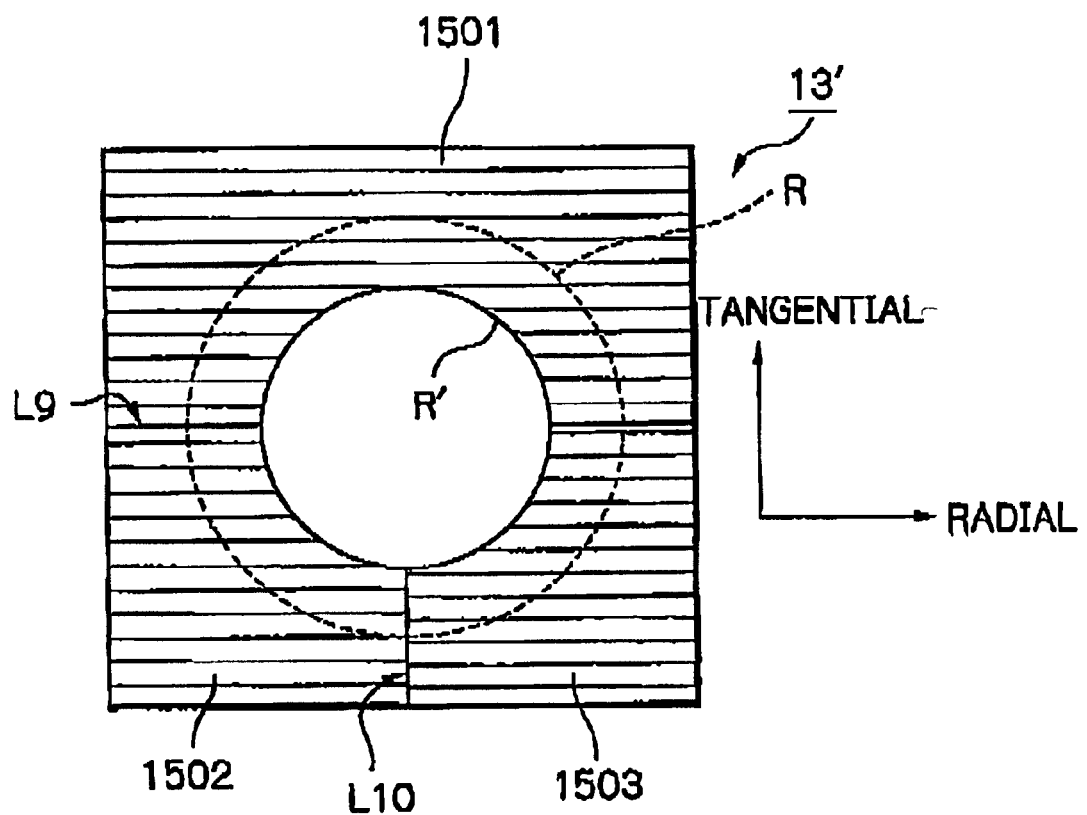

In FIG. 15, which illustrates a third modification of the diffractive grating 13' of FIG. 6, the diffractive grating region is outside of a circle R' within the effective region R. The diffractive grating region is divided by a straight line L9 parallel to the radial direction of the disk 2 including the optical axis and a straight line L10 parallel to the tangential direction of the disk 2 including the optical axis into regions 1501, 1502 and 1503.

The grating patterns of the regions 1501, 1502 and 1503 are equidistant and parallel to the radial direction of the disk 2. On the other hand, the grating patterns of the region 1502 and the region 1501 are out of phase by +$\pi/2$, and the grating patterns of the regions 1503 and 1501 are out of phase by −$\pi/2$. That is, the phase of the grating patterns of the region 1502 is advanced by $\pi$ as compared with the phase of the grating patterns of the region 1503.

Assume that the difference in phase (depth) between the line portions and the space portions of the diffractive grating 13' is $0.232\pi$. In this case, about 87.3% of a light beam incident to the regions 1501, 1502 and 1503 is converted to a zeroth order light beam (transmission light beam), and about 5.1% of the light beam incident to the regions 1501, 1502 and 1503 is converted to ±1st order (diffracted) light beams. On the other hand, most (about 100%) of a light beam incident to a region within the circle R' is transmitted therethrough.

Here, the zeroth order light beams (transmission light beams) of the regions 1501, 1502 and 1503 and the region within the region R' are defined as a main beam M, the +1st order diffracted light beams of the regions 1501, 1502 and 1503 are defined as a sub beam S1, and the −1st order diffracted light beams of the regions 1501, 1502 and 1503 are defined as a sub beam S2

In the sub beam S1, a light beam from the region 1502 is advanced by a phase of $\pi/2$ with respect to a light beam from the region 1501, while a light beam from the region 1503 is retarded by a phase of $\pi/2$ with respect to the light beam from the region 1501. Moreover, the intensity in the center in the sub beam S1 is weaker than that in the main beam M. Similarly, in the sub beam S2, a light beam from the region 1503 is advanced by a phase of $\pi/2$ with respect to a light beam from the region 1501, while a light beam from the region 1502 is retarded by a phase of $\pi/2$ with respect to the light beam from the region 1501. Moreover, the intensity in the center in the sub beam S2 is weaker than that in the main beam M.

Figure 16:
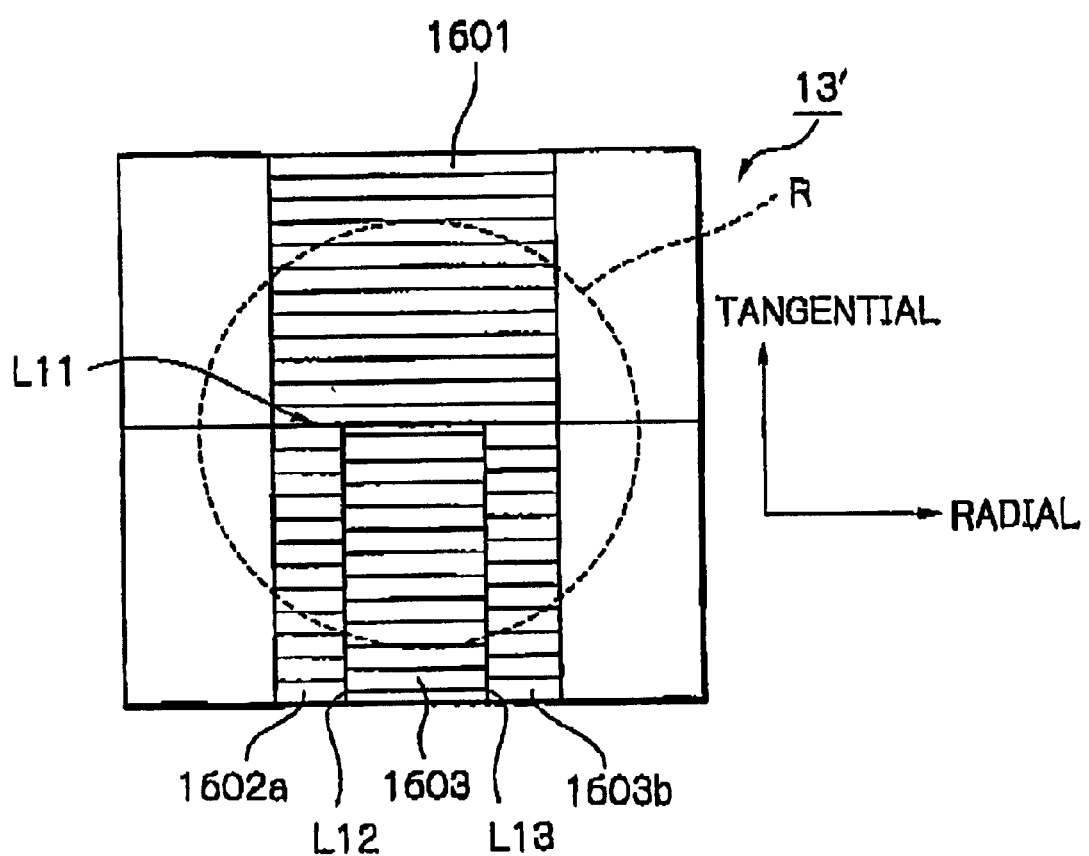

In FIG. 16, which illustrates a fourth modification of the diffractive grating 13' of FIG. 6, the diffractive grating region is inside of a stripe crossing the effective region R. The diffractive grating region is divided by a straight line L11 parallel to the radial direction of the disk 2 including the optical axis and two straight lines L12 and L13 parallel to the tangential direction of the disk 2 into regions 1601, 1602a, 1602b and 1603. In this case, the lines L12 and L13 are linearly-symmetrical with respect to the tangential direction of the disk 2 including the optical axis.

The grating patterns of the regions 1601, 1602a, 1602b and 1603 are equidistant and parallel to the radial direction of the disk 2. On the other hand, the grating patterns of the region 1602a (1602b) and the region 1601 are out of phase by +π/2, and the grating patterns of the regions 1603 and 1601 are out of phase by −π/2. That is, the phase of the grating patterns of the regions 1602a and 1602b is advanced by π as compared with the phase of the grating patterns of the region 1603.

Assume that the difference in phase (depth) between the line portions and the space portions of the diffractive grating 13' is 0.232π. In this case, about 87.3% of a light beam incident to the regions 1601, 1602a, 1602b and 1603 is converted to a zeroth order light beam (transmission light beam), and about 5.1% of the light beam incident to the regions 1601, 1602a, 1602b and 1603 is converted to ±1st order (diffracted) light beams. On the other hand, most (about 100%) of a light beam incident to a region outside the stripe is transmitted therethrough.

Here, the zeroth order light beams (transmission light beams) of the regions 1601, 1602a, 1602b and 1603 and the region outside the stripe are defined as a main beam M, the +1st order diffracted light beams of the regions 1601, 1602a, 1602b and 1603 are defined as a sub beam S1, and the −1st order diffracted light beams of the region 1601, 1602a, 1602b and 1603 are defined as a sub beam S2.

In the sub beam S1, light beams from the regions 1602a and 1602b are advanced by a phase of π/2 with respect to a light beam from the region 1601, while a light beam from the region 1603 is retarded by a phase of π/2 with respect to the light beam from the region 1601. Moreover, the intensity in the radial periphery in the sub beam S1 is weaker than that in the main beam M. Similarly, in the sub bean S2, a light beam from the region 1603 is advanced by a phase of π/2 with respect to a light beam from the region 1601, while light beams from the regions 1602a and 1602b are retarded by a phase of π/2 with respect to the light beam from the region 1601. Moreover, the intensity in the radial periphery in the sub beam S2 is weaker than that in the main beam M.

Figure 17:
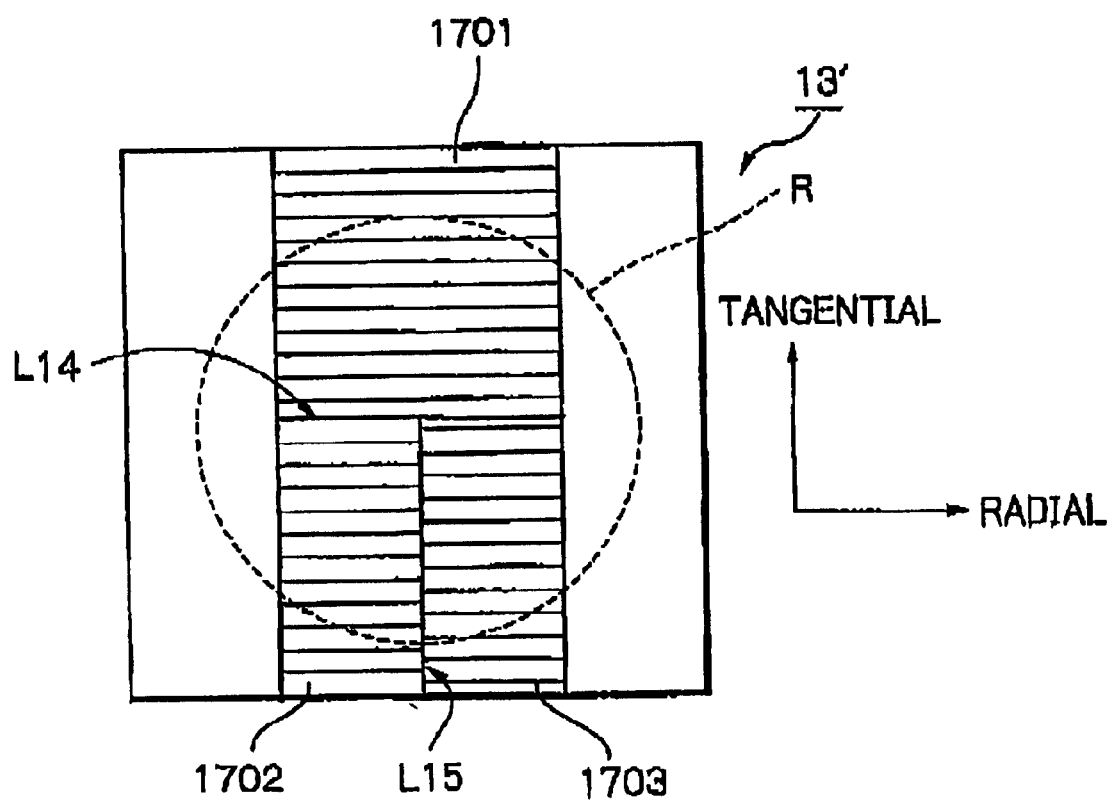

In FIG. 17, which illustrates a fifth modification of the diffractive grating 13' of FIG. 6, the diffractive grating region is inside of a stripe crossing the effective region R. The diffractive grating region is divided by a straight line L14 parallel to the radial direction of the disk 2 including the optical axis and a straight line L15 parallel to the tangential direction of the disk 2 including the optical axis into regions 1701, 1702 and 1703.

The grating patterns of the regions 1701, 1702 and 1703 are equidistant and parallel to the radial direction of the disk 2. On the other hand, the grating patterns of the region 1702 and the region 1701 are out of phase by +π/2, and the grating patterns of the regions 1703 and 1701 are out of phase by −π/2. That is, the phase of the grating patterns of the region 1702 is advanced by π as compared with the phase of the grating patterns of the region 1703.

Assume that the difference in phase (depth) between the line portions and the space portions of the diffractive grating 13' is 0.232π. In this case, about 87.3% of a light beam incident to the regions 1701, 1702 and 1703 is converted to a zeroth order light beam (transmission light beam), and about 5.1% of the light beam incident to the regions 1701, 1702 and 1703 is converted to ±1st order (diffracted) light beams. On the other hand, most (about 100%) of a light beam incident to a region outside the stripe is transmitted therethrough.

Here, the zeroth order light beams (transmission light beams) of the regions 1701, 1702 and 1703 and the region outside the stripe are defined as a main beam M, the +1st order diffracted light beams of the regions 1701, 1702 and 1703 are defined as a sub beam S1, and the −1st order diffracted light beams of the regions 1701, 1702 and 1703 are defined as a sub beam S2.

In the sub beam S1, a light beam from the region 1702 is advanced by a phase of π/2 with respect to a light beam from the region 1701, while a light beam from the region 1703 is retarded by a phase of π/2 with respect to the light beam from the region 1701. Moreover, the intensity in the radial periphery in the sub beam S1 is weaker than that in the main beam M. Similarly, in the sub bean S2, a light beam from the region 1703 is advanced by a phase of π/2 with respect to a light beam from the region 1701, while a light beam from the region 1702 is retarded by a phase of π/2 with respect to the light beam from the region 1701. Moreover, the intensity in the radial periphery in the sub beam S2 is weaker than that in the main beam M.

Figure 18:
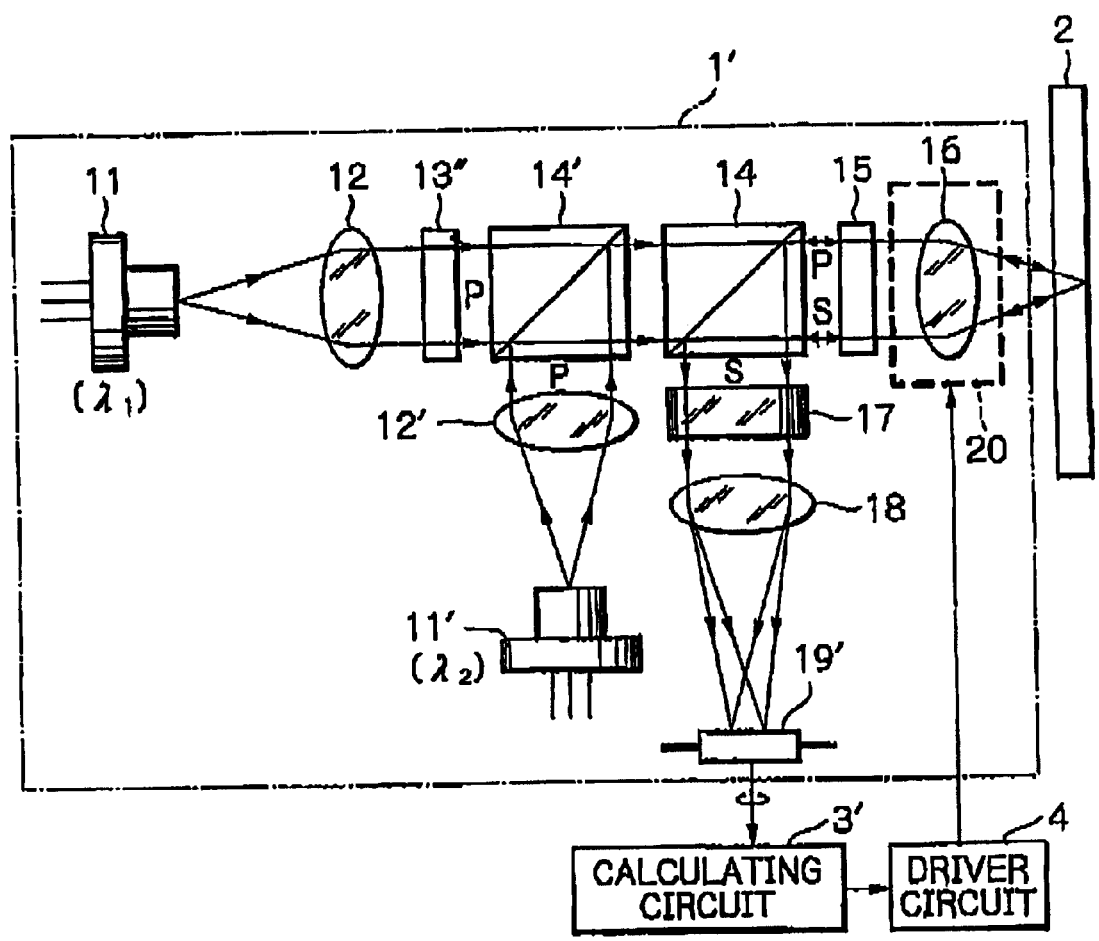
FIG. 18 is a diagram illustrating a second embodiment of the optical head apparatus according to the present invention.

In FIG. 18, which illustrates a second embodiment of the optical head apparatus according to the present invention, the diffractive grating 13' of FIG. 6 is modified into a diffractive grating 13". In this case, the difference in phase (depth) between the line portions and the space portions of the diffractive grating 13" is adjusted so as to generate only ±1st order diffracted light beams (sub beams S1 and S2).

Also, a laser diode 11' and a collimator lens 12' are provided for generating another light beam which corresponds to a zeroth order light beam (main beam M).

Further, a beam splitter 14' is provided for transmitting the ±1st order P-polarized diffracted light beams from the laser diode 11 and reflecting the P-polarized light bean from the laser diode 11', so that the ±1st order P-polarized diffracted light beams from the laser diode 11 and the P-polarized light beam from the laser diode 11' reach the beam splitter 14.

Note that the wavelength $\lambda_1$ of a light beam generated from the laser diode 11 is different from the wavelength $\lambda_2$ of a light beam generated from the laser diode 11'. For example, if the beam splitter 14 has transmittivity characteristics as shown in FIG. 19A, the beam splitter 14 transmits the P-polarized light beams from the laser diodes 11 and 11' therethrough and reflects the S-polarized light beams from the laser diodes 11 and 11' thereby. On the other hand, if the beam splitter 14' has transmittivity characteristics as shown in FIG. 19B, the beam splitter 14' transmits the P-polarized light beam from the laser diode therethrough and reflects the P-polarized light beam from the laser diode 11' thereby.

Thus, the optical head apparatus of FIG. 18 operates in the same way as the optical head apparatus of FIG. 6.

Figure 20A:
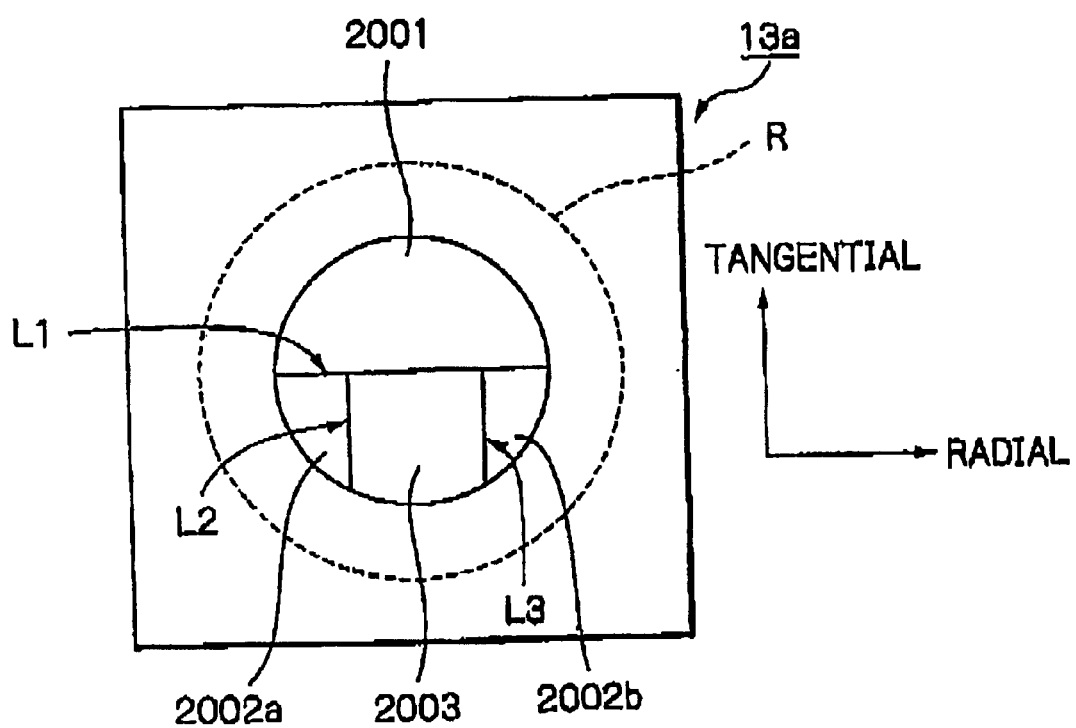
FIG. 20A is a plan view of the phase control element of FIG. 18.
Figure 20B:
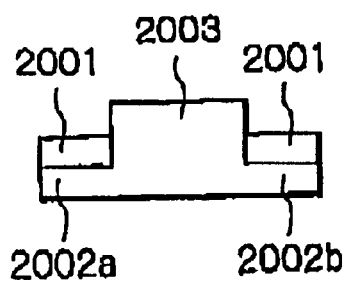
FIG. 20B is a side view of the phase control element of FIG. 18.

In FIGS. 20A and 20B, which are plan and side views, respectively, of a phase control element 13a, which is a replacement of the diffractive grating 13" of FIG. 18, the phase control region is circular within the effective region R. The phase control region is divided by a straight line L1 parallel to the radial direction of the disk 2 including the optical axis and two straight lines L2 and L3 parallel to the tangential direction of the disk 2 into regions 2001, 2002a, 2002b and 2003. In this case, the lines L2 and L3 are linearly-symmetrical with respect to the tangential direction of the disk 2 including the optical axis.

The thicknesses of the regions 2001, 2002a, 2002b and 2003 are determined so that the transmission light beams of the region 2002a (2002b) and the region 2001 are out of phase by +π/2, and the transmission light beams of the regions 2003 and 2001 are out of phase by −π/2. That is, the phase of the transmission light beams of the regions 2002a and 2002b are advanced by π as compared with the phase of the transmission light beam of the region 2003. A region outside of the regions 2001, 2002a, 2002b and 2003 does not transmit any light beam.

In this case, the transmission light beams of the regions 2001, 2002a, 2002b and 2003 correspond to a +1st order diffracted light beam (sub beam S1) or a −1st order diffracted light beam (sub beam S2).

Note that the phase control element 13a of FIGS. 20A and 20B can be modified to correspond to the modifications of the diffractive grating 13' of FIG. 6 as illustrated in FIGS. 13, 14, 15, 16 and 17.

Figure 21:
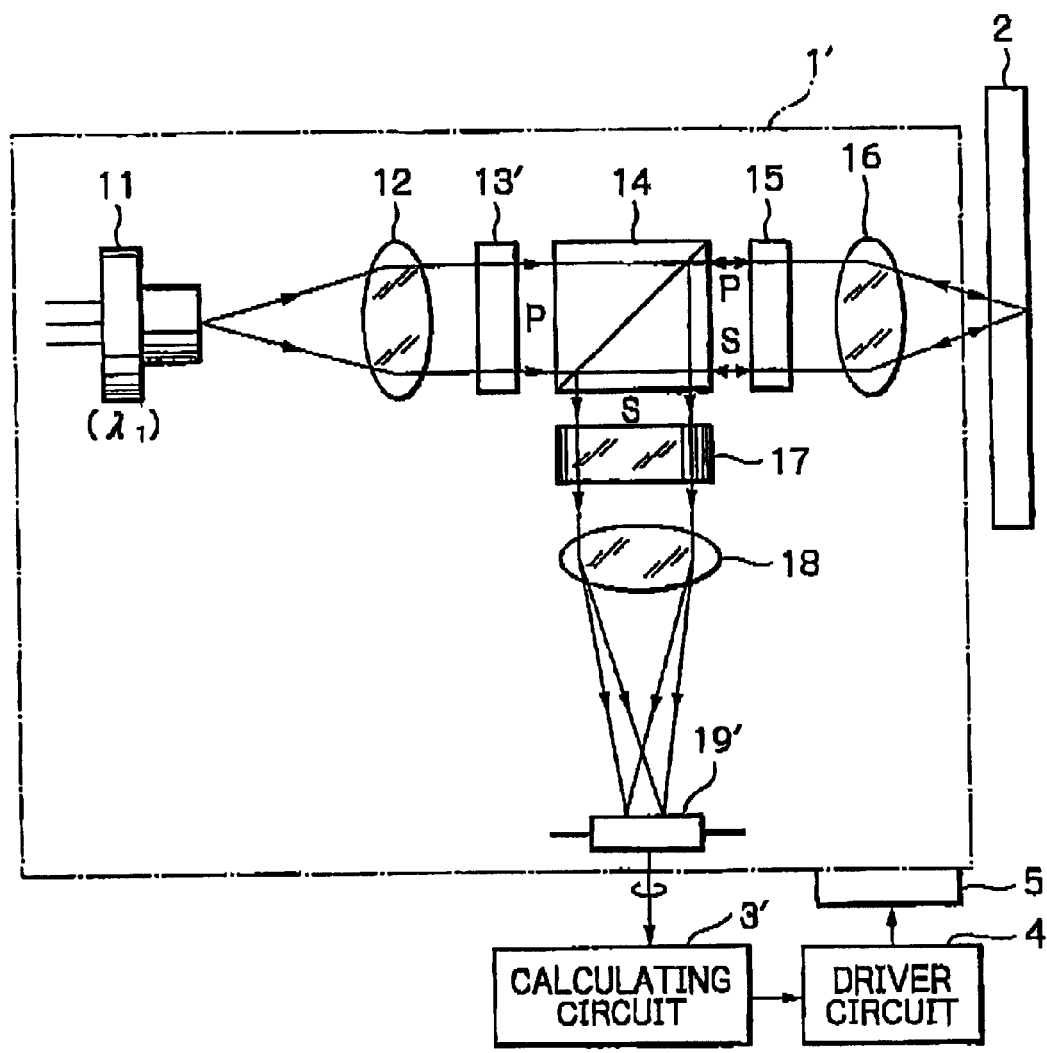
FIGS. 21 and 22 are diagrams illustrating modifications of the optical head apparatus of FIG. 6.

In FIG. 21, which illustrates a modification of the optical head apparatus of FIG. 6, the driver circuit 4 drives an actuator 5 to control the optical head apparatus 1' per se, so that the objective lens 16 is substantially tilted in the radial direction of the disk 2 in accordance with the radial tilt signal (see: JP-A-9-161293).

Figure 22:
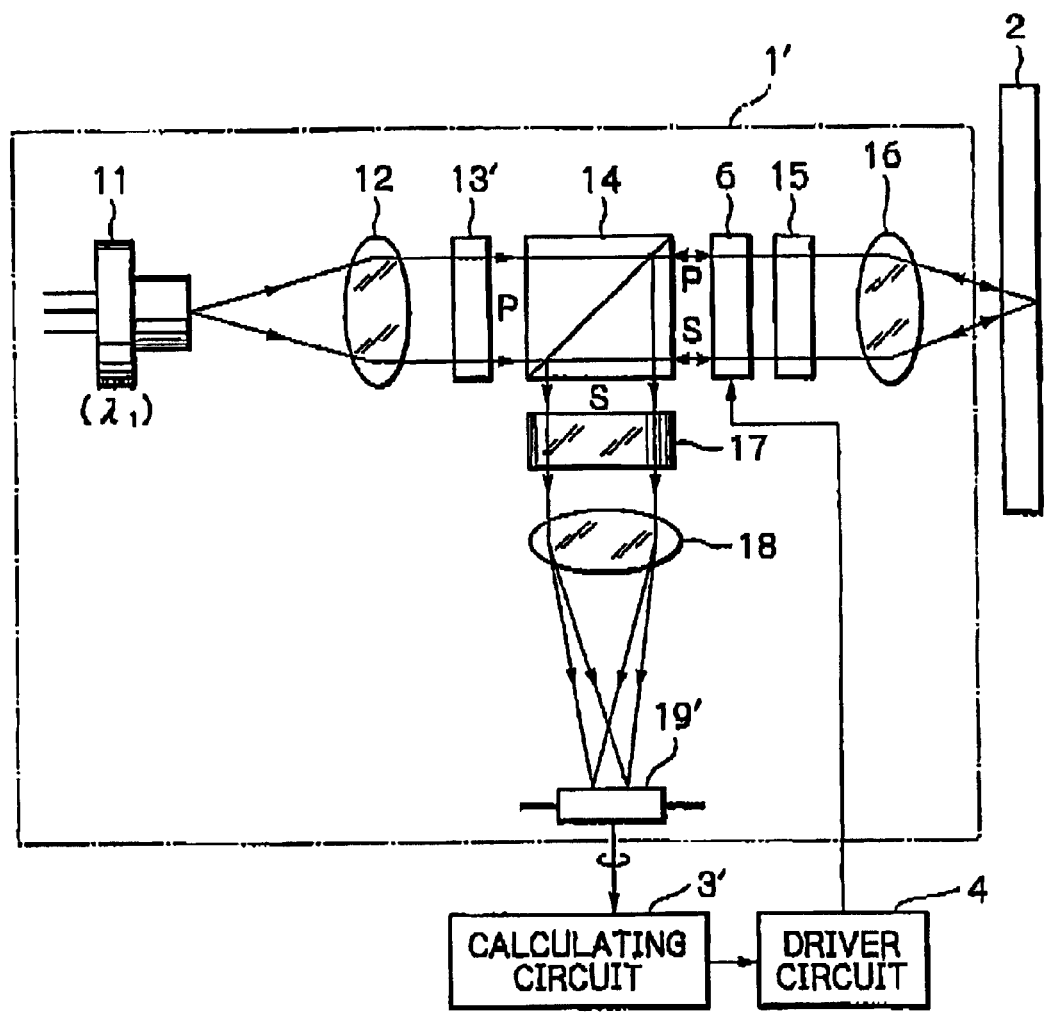

In FIG. 22, which illustrates another modification of the optical head apparatus of FIG. 6, a liquid crystal optical element 6 is provided between the beam splitter 14 and the quarter-wave plate 15, instead of the actuator 20 of FIG. 6, so that the driver circuit 4 applies voltages to the liquid crystal optical element 6. As a result, the radial tilt signal is brought close to zero. In this case, since the liquid crystal optical element 6 is divided into a plurality of regions, the voltages applied to the regions change the coma aberration for the transmission light beam therethrough, so that the coma aberration due to the radial tilt of the disk 2 can be compensated for by the changed coma aberration. The liquid crystal optical element is disclosed in Sakashi Ohtaki et al., "The Applications of a Liquid Crystal Panel for the 15 Gbyte Optical Disk Systems", Jpn. J. Appl. Phys. Vol. 38, pp. 1744–1749, 1999.

In the above-described embodiments, since the main beam M and the sub beams S1 and S2 are arranged at the same track 21 of the disk 2, the relative arrangement of the beams M, S1 and S2 does not change even if the pitch of tracks is changed. Therefore, a tracking error signal by a differential push-pull method and a radial tilt signal can be obtained for a disk having an arbitrary track pitch.

As explained hereinabove, according to the present invention, since a tracking error signal is detected by a differential push-pull method and a radial tilt is detected in accordance with the zero crossing point of the radial tilt signal relative to that of the tracking error signal, a radial tilt of an optical recording medium can be detected and compensated for by reducing the lens radial shift offset in a tracking error signal.

Also, since only three beams each requiring four photodetecting portions are used, the control unit can be simplified.

Further, since an RF signal is derived from the entire of a reflected main beam, the RF signal can have a high S/N ratio.

What is claimed is:

1. An optical head apparatus for an optical recording medium comprising:
    a light source for emitting a light beam;
    an objective lens for focusing said light beam at said optical recording medium and receiving a reflected light beam from said optical recording medium;
    a photodetector for receiving said reflected light beam from said objective lens; and
    a unit, provided between said light source and said objective lens, for generating a main beam and sub beams from said light beam, intensity distributions of said main beam and said sub beams being different from each other, each of said sub beams being divided into a plurality of portions having different phase distributions from each other,
    said photodetector comprising photodetecting portions for each of said main beam and said sub beams, thus obtaining a push-pull signal from each of said main beam and said sub beams.

2. The apparatus as set forth in claim 1, wherein each of said sub beams is divided into first and second portions, the first portion of each of said sub beams incident to said optical recording medium has an approximately constant phase, and the second portion of each of said sub beams is divided by two straight lines parallel to a tangential direction of said optical recording medium and linearly-symmetrical with respect to the tangential direction of said optical recording medium including an optical axis into an inner portion and two outer portions, so that the inner portion of said sub beam incident to said optical recording medium is out of phase by $\pi$ from the outer portions of each of said sub beams incident to said optical recording medium.

3. The apparatus as set forth in claim 1, wherein each of said sub beams is divided into first and second portions, the first portion of each of said sub beam incident to said optical recording medium has an approximately constant phase, and the second portion of each of said sub beams is divided by a straight line parallel to a tangential direction of said optical recording medium including an optical axis into a left portion and a right portion, so that the left portion of each of said sub beams incident to said optical recording medium is out of phase by $\pi$ from the right portion of each of said sub beams incident to said optical recording medium.

4. The apparatus as set forth in claim 1, wherein said unit comprises a diffractive grating.

5. The apparatus as set forth in claim 4, wherein a diffractive grating region of said diffractive grating is divided by a straight line parallel to a radial direction of said optical recording medium including an optical axis and two straight lines parallel to a tangential direction of said optical recording medium and linearly-symmetrical with respect to the tangential direction of said optical recording medium including said optical axis into first, second and third regions,
    a transmitted light beam from said diffractive grating corresponding to said main beam,
    a diffracted light beam from said first region of said diffractive grating corresponding to a first portion of each of said sub beams and having an approximately constant phase,
    a diffracted light beam from said second and third regions of said diffractive grating corresponding to a second portion of each of said sub beams and being out of phase by $\pi$ with each other.

6. The apparatus as set forth in claim 5, wherein said diffractive grating region is inside of a circle having a diameter smaller than an effective diameter of said objective lens.

7. The apparatus as set forth in claim 5, wherein said diffractive grating region is outside of a circle having a diameter smaller than an effective diameter of said objective lens.

8. The apparatus as set forth in claim 5, wherein said diffractive grating region is inside of a stripe having a width smaller than an effective diameter of said objective lens.

9. The apparatus as set forth in claim 4, wherein a diffractive grating region of said diffractive grating is divided by a straight line parallel to a radial direction of said optical recording medium including an optical axis and a straight line parallel to a tangential direction of said optical recording medium including said optical axis into first, second and third regions,
    a transmitted light beam from said diffractive grating corresponding to said main beam, a diffracted light beam from said first region of said diffractive grating corresponding to a first portion of each of said sub beams and having an approximately constant phase, a diffracted light beam from said second and third regions of said diffractive grating corresponding to a second portion of each of said sub beams and being out of phase by $\pi$ with each other.

10. The apparatus as set forth in claim 9, wherein said diffractive grating region is inside of a circle having a diameter smaller than an effective diameter of said objective lens.

11. The apparatus as set forth in claim 9, wherein said diffractive grating region is outside of a circle having a diameter smaller than an effective diameter of said objective lens.

12. The apparatus as set forth in claim 9, wherein said diffractive grating region is inside of a stripe having a width smaller than an effective diameter of said objective lens.

13. The apparatus as set forth in claim 1, wherein said light source includes a first light source for emitting a first light beam and a second light source for emitting a second light beam, said second light beam corresponding to said main beam, said unit being provided between said first light source and said objective lens, for generating each of said sub beams from said first light beam.

14. The apparatus as set forth in claim 1, wherein said unit comprises a phase control element, a phase control region of said phase control element being divided by a straight line parallel to a radial direction of said optical recording medium including an optical axis and two straight lines parallel to a tangential direction of said optical recording medium and linearly-symmetrical with respect to the tangential direction of said optical recording medium including said optical axis into first, second and third regions, a transmission light beam from said first region of said phase control element corresponding to a first portion of each of said sub beams and having an approximately constant phase, a transmission light beam from said second and third regions of said phase control element corresponding to a second portion of each of said sub beams and being out of phase by $\pi$ with each other.

15. The apparatus as set forth in claim 14, wherein said phase control region is inside of a circle having a diameter smaller than an effective diameter of said objective lens.

16. The apparatus as set forth in claim 14, wherein said phase control region is outside of a circle having a diameter smaller than an effective diameter of said objective lens.

17. The apparatus as set forth in claim 14, wherein said phase control region is inside of a stripe having a width smaller than an effective diameter of said objective lens.

18. The apparatus as set forth in claim 13, wherein said unit comprises a phase control element, a phase control region of said phase control element being divided by a straight line parallel to a radial direction of said optical recording medium including an optical axis and a straight line parallel to a tangential direction of said optical recording medium including said optical axis into first, second and third regions, a transmission light beam from said first region of said phase control element corresponding to a first portion of each of said sub beams and having an approximately constant phase, a transmission light beam from said second and third regions of said phase control element corresponding to a second portion of each of said sub beams and being out of phase by $\pi$ with each other.

19. The apparatus as set forth in claim 18, wherein said phase control region is inside of a circle having a diameter smaller than an effective diameter of said objective lens.

20. The apparatus as set forth in claim 18, wherein said phase control region is outside of a circle having a diameter smaller than an effective diameter of said objective lens.

21. The apparatus as set forth in claim 18, wherein said phase control region is inside of a stripe having a width smaller than an effective diameter of said objective lens.

22. The apparatus as set forth in claim 1, wherein each of said sub beams is divided into first and second portions, and a radial tilt signal is calculated in accordance with the push-pull signals from said first and second portions of each of said sub beans, so that a radial tilt of said optical recording medium is corrected in accordance with said radial tilt signal.

23. The apparatus as set forth in claim 22, wherein said radial tilt signal is calculated by a difference between the push-pull signal from said first portion of each of said sub beams and the push-pull signal from said second portion of each of said sub beams.

24. The apparatus as set forth in claim 22, wherein the radial tilt of said optical recording medium is corrected by tilting said objective lens in a radial direction of said optical recording medium.

25. The apparatus as set forth in claim 22, wherein the radial tilt of said optical recording medium is corrected by tilting said optical head apparatus in a radial direction of said optical recording medium.

26. The apparatus as set forth in claim 22, further comprising a liquid crystal optical element between said light source and said objective lens, the radial tilt of said optical recording medium being corrected by applying voltages to said liquid crystal optical element in accordance with said radial tilt signal.

27. The apparatus as set forth in claim 1, wherein a focus error signal is calculated in accordance with the astigmatism signal of said main beam.

28. The apparatus as set forth in claim 1, wherein a tracking error signal is calculated in accordance with the push-pull signals of said main beam and each of said sub beams.

29. The apparatus as set forth in claim 1, wherein said main beam and said sub beam are arranged on the same track of said optical recording medium.

30. The apparatus as set forth in claim 1, wherein said sub beam is divided into first and second portions, the first portion of said sub beam incident to said optical recording medium having an approximately constant phase, the second portion of said sub beam incident to said optical recording medium being divided into a plurality of portions being out of phase by approximately $\pi$ with each other.

31. An optical head apparatus for an optical recording medium comprising:

a light source for emitting a light beam;

a diffractive grating for receiving said light beam to generate a main beam and first and second sub beams, a diffractive grating region of said diffractive grating being divided by a straight line parallel to a radial direction of said optical recording medium including an optical axis and two straight lines parallel to a tangential direction of said optical recording medium and linearly-symmetrical with respect to the tangential direction of said optical recording medium including said optical axis into first, second and third regions, grating patterns of said first, second and third regions being determined so that the grating patterns of said first and second regions are out of phase by $\pi/2$ and the grating patterns of said first and third regions are out of phase by $-\pi/2$;

a beam splitter;

an objective lens for receiving said main beam and said first and second sub beams via said beam splitter, focusing said main beam and said first and second sub beams at said optical recording medium and receiving a reflected main beam and reflected first and second sub beams from said optical recording medium; and a photodetector for receiving said reflected main beam and said reflected first and second sub beams from said objective lens via said beam splitter, said photodetector comprising four photodetecting portions for each of said reflected main beam, said reflected first sub beam and said reflected second sub beam, thus obtaining a push-pull signal from each of said reflected main beam and said reflected first and second sub beams.

32. The apparatus as set forth in claim 31, wherein said diffractive grating region is inside of a circle having a diameter smaller than an effective diameter of said objective lens.

33. The apparatus as set forth in claim 31, wherein said diffractive grating region is outside of a circle having a diameter smaller than an effective diameter of said objective lens.

34. The apparatus as set forth in claim 31, wherein said diffractive grating region is inside of a stripe having a width smaller than an effective diameter of said objective lens.

35. An optical head apparatus for an optical recording medium comprising:

a light source for emitting a light beam;

a diffractive grating for receiving said light beam to generate a main beam and first and second sub beams, a diffractive grating region of said diffractive grating being divided by a straight line parallel to a radial direction of said optical recording medium including an optical axis and a straight line parallel to a tangential direction of said optical recording medium including said optical axis into first, second and third regions, grating patterns of said first, second and third regions being determined so that the grating patterns of said first and second regions are out of phase by $\pi/2$ and the grating patterns of said first and third regions are out of phase by $-\pi/2$;

a beam splitter;

an objective lens for receiving said main beam and said first and second sub beams via said beam splitter, focusing said main beam and said first and second sub beams at said optical recording medium and receiving a reflected main beam and reflected first and second sub beams from said optical recording medium; and a photodetector for receiving said reflected main beam and said reflected first and second sub beams from said objective lens via said beam splitter, said photodetector comprising four photodetecting portions for each of said reflected main beam, said reflected first sub beam and said reflected second sub beam, thus obtaining a push-pull signal from each of said reflected main beam and said reflected first and second sub beams.

36. The apparatus as set forth in claim 35, wherein said diffractive grating region is inside of a circle having a diameter smaller than an effective diameter of said objective lens.

37. The apparatus as set forth in claim 35, wherein said diffractive grating region is outside of a circle having a diameter smaller than an effective diameter of said objective lens.

38. The apparatus as set forth in claim 35, wherein said diffractive grating region is inside of a stripe having a width smaller than an effective diameter of said objective lens.

39. An optical head apparatus for an optical recording medium comprising:

a first light source for emitting a first light beam;

a second light source for emitting a second light beam as a main beam;

a phase control element for receiving said first light beam to generate a sub beam, a phase control region of said phase control element being divided by a straight line parallel to a radial direction of said optical recording medium including an optical axis and two straight lines parallel to a tangential direction of said optical recording medium and linearly-symmetrical with respect to the tangential direction of said optical recording medium including said optical axis into first, second and third regions, thicknesses of said first, second and third regions being determined so that the transmission light beams of said first and second regions are out of phase by $\pi/2$ and the transmission light beams of said first and third regions are out of phase by $-\pi/2$;

first and second beam splitters;

an objective lens for receiving said main beam and said sub beam via said first and second beam splitters, focusing said main beam and said sub beam at said optical recording medium and receiving a reflected main beam and a reflected sub beam from said optical recording medium; and a photodetector for receiving said reflected main beam and said reflected sub beam from said objective lens via said second beam splitter, said photodetector comprising four photodetecting portions for each of said reflected main beam and said reflected sub beam, thus obtaining a push-pull signal from each of said reflected main beam and said reflected sub beam.

40. The apparatus as set forth in claim 39, wherein said phase control region is inside of a circle having a diameter smaller than an effective diameter of said objective lens.

41. The apparatus as set forth in claim 39, wherein said phase control region is outside of a circle having a diameter smaller than an effective diameter of said objective lens.

42. The apparatus as set forth in claim 39, wherein said phase control region is inside of a stripe having a width smaller than an effective diameter of said objective lens.

43. An optical head apparatus for an optical recording medium comprising:

a first light source for emitting a first light beam;

a second light source for emitting a second light beam as a main beam;

a phase control element for receiving said first light beam to generate a sub beam, a phase control region of said phase control element being divided by a straight line parallel to a radial direction of said optical recording medium including an optical axis and a straight line parallel to a tangential direction of said optical recording medium including said optical axis into first, second and third regions, thicknesses of said first, second and third regions being determined so that the transmission light beams of said first and second regions are out of phase by $\pi/2$ and the transmission light beans of said first and third regions are out of phase by $-\pi/2$;

first and second beam splitters;

an objective lens for receiving said main beam and said sub beam via said first and second beam splitters, focusing said main beam and said sub beam at said optical recording medium and receiving a reflected main beam and a reflected sub beam from said optical recording medium; and a photodetector for receiving said reflected main beam and said reflected sub beam from said objective lens via said second beam splitter, said photodetector comprising four photodetecting portions for each of said reflected main beam and said reflected sub beam, thus obtaining a push-pull signal from each of said reflected main beam and said reflected sub beam.

44. The apparatus as set forth in claim 43, wherein said phase control region is inside of a circle having a diameter smaller than an effective diameter of said objective lens.

45. The apparatus as set forth in claim 43, wherein said phase control region is outside of a circle having a diameter smaller than an effective diameter of said objective lens.

46. The apparatus as set forth in claim 43, wherein said phase control region is inside of a stripe having a width smaller than an effective diameter of said objective lens.

47. An optical information apparatus for performing at least one of recording and reproducing operations upon an optical recording medium comprising:

an optical head; and a control unit, connected to said optical head, for compensating for a radial tilt of said optical recording medium, said optical head comprising:

a light source for emitting a light beam;

an objective lens for focusing said light beam at said optical recording medium and receiving a reflected light beam from said optical recording medium;

a photodetector for receiving said reflected light beam from said objective lens; and a unit, provided between said light source and said objective lens, for generating a main beam and sub beams from said light beam, intensity distributions of said main beam and each of said sub beams being different from each other, said sub beam being divided into a plurality of portions having different phase distributions from each other, said photodetector comprising photodetecting portions for each of said main beam and each of said sub beams, thus obtaining a push-pull signal from each of said main beam and said sub beams.

48. The apparatus as set forth in claim 47, wherein said optical head further comprises an actuator for tilting said objective lens in the radial direction of said optical recording medium, so that said control unit controls said actuator to compensate for the radial tilt of said optical recording medium.

49. The apparatus as set forth in claim 47, further comprising an actuator for tilting said optical head in the radial direction of said optical recording medium, so that said control unit controls said actuator to compensate for the radial tilt of said optical recording medium.

50. The apparatus as set forth in claim 47, wherein said optical head further comprises a liquid crystal optical element, provided between said light source and said objective lens, for changing the coma aberration for a transmission light beam therethrough, so that said control unit controls said liquid crystal optical element to compensate for the radial tilt of said optical recording medium.

51. An optical information apparatus for performing at least one of recording and reproducing operations upon an optical recording medium comprising;

an optical head; and a control unit, connected to said optical head, for compensating for a radial tilt of said optical recording medium, said optical head comprising:

light source for emitting a light beam;

a diffractive grating for receiving said light beam to generate a main beam and first and second sub beams, a diffractive grating region of said diffractive grating being divided by a straight line parallel to a radial direction of said optical recording medium including an optical axis and two straight lines parallel to a tangential direction of said optical recording medium and linearly-symmetrical with respect to the tangential direction of said optical recording medium including said optical axis into first, second and third regions, grating patterns of said first, second and third regions being determined so that the grating patterns of said first and second regions are out of phase by $\pi/2$ and the grating patterns of said first and third regions are out of phase by $-\pi/2$;

a beam splitter;

an objective lens for receiving said main beam and said first and second sub beams via said beam splitter, focusing said main beam and said first and second sub beams at said optical recording medium and receiving a reflected main beam and reflected first and second sub beams from said optical recording medium; and a photodetector for receiving said reflected main beam and said reflected first and second sub beams from said objective lens via said beam splitter, said photodetector comprising four photodetecting portions for each of said reflected main beam, said reflected first sub beam and said reflected second sub beam, thus obtaining a push-pull signal from each of said reflected main beam and said reflected first and second sub beams.

52. The apparatus as set forth in claim 51, wherein said optical head further comprises an actuator for tilting said objective lens in the radial direction of said optical recording medium, so that said control unit controls said actuator to compensate for the radial tilt of said optical recording medium.

53. The apparatus as set forth in claim 51, further comprising an actuator for tilting said optical head in the radial direction of said optical recording medium, so that said control unit controls said actuator to compensate for the radial tilt of said optical recording medium.

54. The apparatus as set forth in claim 51, wherein said optical head further comprises a liquid crystal optical element, provided between said light source and said objective lens, for changing the coma aberration for a transmission light beam therethrough, so that said control unit controls said liquid crystal optical element to compensate for the radial tilt of said optical recording medium.

55. An optical information apparatus for performing at least one of recording and reproducing operations upon an optical recording medium comprising:

an optical head; and a control unit, connected to said optical head, for compensating for a radial tilt of said optical recording medium, said optical head comprising:

a light source for emitting a light beam;

a diffractive grating for receiving said light beam to generate a main beam and first and second sub beams, a diffractive grating region of said diffractive grating being divided by a straight line parallel to a radial direction of said optical recording medium including an optical axis and a straight line parallel to a tangential direction of said optical recording medium including said optical axis into first, second and third regions, grating patterns of said first, second and third regions being determined so that the grating patterns of said first and second regions are out of phase by $\pi/2$ and the grating patterns of said first and third regions are out of phase by $-\pi/2$;

a beam splitter;

an objective lens for receiving said main beam and said first and second sub beams via said beam splitter, focusing said main beam and said first and second sub beams at said optical recording medium and receiving a reflected main beam and reflected first and second sub beams from said optical recording medium; and a photodetector for receiving said reflected main beam and said reflected first and second sub beams from said objective lens via said beam splitter, said photodetector comprising four photodetecting portions for each of said reflected main beam, said reflected first sub beam and said reflected second sub beam, thus obtaining a push-pull signal from each of said reflected main beam and said reflected first and second sub beams.

56. The apparatus as set forth in claim 55, wherein said optical head further comprises an actuator for tilting said objective lens in the radial direction of said optical recording medium, so that said control unit controls said actuator to compensate for the radial tilt of said optical recording medium.

57. The apparatus as set forth in claim 55, further comprising an actuator for tilting said optical head in the radial direction of said optical recording medium, so that said control unit controls said actuator to compensate for the radial tilt of said optical recording medium.

58. The apparatus as set forth in claim 55, wherein said optical head further comprises a liquid crystal optical element, provided between said light source and said objective lens, for changing the coma aberration for a transmission light beam therethrough, so that said control unit controls said liquid crystal optical element to compensate for the radial tilt of said optical recording medium.

59. An optical information apparatus for performing at least one of recording and reproducing operations upon an optical recording medium comprising:

an optical head; and a control unit, connected to said optical head, for compensating for a radial tilt of said optical recording medium, said optical head comprising:

a first light source for emitting a first light beam;

a second light source for emitting a second light beam as a main beam;

a phase control element for receiving said first light beam to generate a sub beam, a phase control region of said phase control element being divided by a straight line parallel to a radial direction of said optical recording medium including an optical axis and two straight lines parallel to a tangential direction of said optical recording medium and linearly-symmetrical with respect to the tangential direction of said optical recording medium including said optical axis into first, second and third regions, thicknesses of said first, second and third regions being determined so that the transmission light beams of said first and second regions are out of phase by $\pi/2$ and the transmission light beams of said first and third regions are out of phase by $-\pi/2$;

first and second beam splitters;

an objective lens for receiving said main beam and said sub beam via said first and second beam splitters, focusing said main beam and said sub beam at said optical recording medium and receiving a reflected main beam and a reflected sub beam from said optical recording medium; and a photodetector for receiving said reflected main beam and said reflected sub beam from said objective lens via said second beam splitter, said photodetector comprising four photodetecting portions for each of said reflected main beam and said reflected sub beam, thus obtaining a push-pull signal from each of said reflected main beam and said reflected sub beam.

60. The apparatus as set forth in claim 59, wherein said optical head further comprises an actuator for tilting said objective lens in the radial direction of said optical recording medium, so that said control unit controls said actuator to compensate for the radial tilt of said optical recording medium.

61. The apparatus as set forth in claim 59, further comprising an actuator for tilting said optical head in the radial direction of said optical recording medium, so that said control unit controls said actuator to compensate for the radial tilt of said optical recording medium.

62. The apparatus as set forth in claim 59, wherein said optical head further comprises a liquid crystal optical element, provided between said light source and said objective lens, for changing the coma aberration for a transmission light beam therethrough, so that said control unit controls said liquid crystal optical element to compensate for the radial tilt of said optical recording medium.

63. An optical information apparatus for performing at least one of recording and reproducing operations upon an optical recording medium comprising:

an optical head; and a control unit, connected to said optical head, for compensating for a radial tilt of said optical recording medium, said optical head comprising:

a first light source for emitting a first light beam;

a second light source for emitting a second light beam as a main beam;

a phase control element for receiving said first light beam to generate a sub beam, a phase control region of said phase control element being divided by a straight line parallel to a radial direction of said optical recording medium including an optical axis and a straight line parallel to a tangential direction of said optical recording medium including said optical axis into first, second and third regions, thicknesses of said first, second and third regions being determined so that the transmission light beams of said first and second regions are out of phase by $\pi/2$ and the transmission light beams of said first and third regions are out of phase by $-\pi/2$;

first and second beam splitters;

an objective lens for receiving said main beam and said sub beam via said first and second beam splitters, focusing said main beam and said sub beam at said optical recording medium and receiving a reflected main beam and a reflected sub beam from said optical recording medium; and a photodetector for receiving said reflected main beam and said reflected sub beam from said objective lens via said second beam splitter, said photodetector comprising four photodetecting portions for each of said reflected main beam and said reflected sub beam, thus obtaining a push-pull signal from each of said reflected main beam and said reflected sub beam.

64. The apparatus as set forth in claim 63, wherein said optical head further comprises an actuator for tilting said objective lens in the radial direction of said optical recording medium, so that said control unit controls said actuator to compensate for the radial tilt of said optical recording medium.

65. The apparatus as set forth in claim 63, further comprising an actuator for tilting said optical head in the radial direction of said optical recording medium, so that said control unit controls said actuator to compensate for the radial tilt of said optical recording medium.

66. The apparatus as set forth in claim 63, wherein said optical head further comprises a liquid crystal optical element, provided between said light source and said objective lens, for changing the coma aberration for a transmission light beam therethrough, so that said control unit controls said liquid crystal optical element to compensate for the radial tilt of said optical recording medium.

67. A method for controlling an optical head apparatus for an optical recording medium, said optical head apparatus including a light source, an objective lens, a photodetector and a unit provided between said light source and said objective lens, comprising the steps of:

emitting a light beam from said light source, so that said unit generates a main beam and sub beams from said light beam, intensity distributions of said main beam and said sub beam being different from each other, each of said sub beams being divided into a plurality of portions having different phase distributions from each other;

focusing said main beam and said sub beam at said optical recording medium;

receiving a reflected main beam and a reflected sub beam from said optical recording tedium by said photodetector, so that a push-pull signal is obtained from each of said main beam and said sub beams; and compensating for a radial tilt of said optical recording medium.

* * * * *